(12) United States Patent
Shigemura

(10) Patent No.: US 9,606,366 B2
(45) Date of Patent: Mar. 28, 2017

(54) STEREOSCOPIC IMAGE DISPLAY DEVICE, TERMINAL DEVICE AND DISPLAY CONTROLLER

(71) Applicant: NLT TECHNOLOGIES, LTD., Kanagawa (JP)

(72) Inventor: Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 351 days.

(21) Appl. No.: 14/185,945

(22) Filed: Feb. 21, 2014

(65) Prior Publication Data
US 2014/0240475 A1 Aug. 28, 2014

(30) Foreign Application Priority Data

Feb. 27, 2013 (JP) ................. 2013-037250
Jan. 6, 2014 (JP) ................. 2014-000421

(51) Int. Cl.
*G02B 27/22* (2006.01)
*G09G 5/00* (2006.01)
(Continued)

(52) U.S. Cl.
CPC ..... *G02B 27/2214* (2013.01); *G02B 27/2228* (2013.01); *H04N 13/0404* (2013.01);
(Continued)

(58) Field of Classification Search
CPC ............ G02B 27/2214; G02B 27/2228; H04N 13/0409; H04N 13/0404; H04N 13/0406; H04N 13/0422; H04N 13/0468
See application file for complete search history.

(56) References Cited

U.S. PATENT DOCUMENTS 8,416,287 B2 4/2013 Hiroya et al.
9,047,827 B2* 6/2015 Kim .................. G09G 3/3413
(Continued)

FOREIGN PATENT DOCUMENTS

CN 101470268 7/2009
JP 2006-18282 1/2006
(Continued)

OTHER PUBLICATIONS

Extended European search report, dated Oct. 13, 2014, in corresponding European Patent Application No. 14156564.8.
(Continued)

*Primary Examiner* — Dave Czekaj
*Assistant Examiner* — Alison Slater
(74) *Attorney, Agent, or Firm* — Young & Thompson

(57) ABSTRACT

A stereoscopic image display device includes: a display panel in which pixels each constituted with N×N pieces (N is a natural number of 2 or larger) of sub-pixels colored in M (M is a natural number of 1 or larger) primary colors are arranged in matrix; and an optical separation module in which optical elements which distribute exit light from each of the pixels according to parallax images in a first direction and a second direction along layout of the pixels are arranged by being corresponded to each of the pixels. The neighboring sub-pixels within the pixels are of different colors, array pitches of the sub-pixels are uniform in the first and second directions, same numbers of the parallax images are displayed for the first direction and the second direction within the pixels, and numbers of the sub-pixels in different colors within the parallax images are equivalent.

24 Claims, 30 Drawing Sheets

(51) Int. Cl.
  *G06T 15/00* (2011.01)
  *H04N 13/04* (2006.01)
  *H04N 13/00* (2006.01)

(52) U.S. Cl.
  CPC ..... *H04N 13/0406* (2013.01); *H04N 13/0409* (2013.01); *H04N 13/0422* (2013.01); *H04N 13/0468* (2013.01)

(56) References Cited

U.S. PATENT DOCUMENTS

| | | | |
|---|---|---|---|
| 2009/0168167 A1 | 7/2009 | Hiroya et al. | |
| 2011/0234582 A1 | 9/2011 | Daiku et al. | |
| 2012/0113100 A1* | 5/2012 | Niioka | G02B 27/2214 345/419 |
| 2012/0320011 A1 | 12/2012 | Koyama | |
| 2014/0029095 A1* | 1/2014 | Allio | H04N 13/0404 359/464 |

FOREIGN PATENT DOCUMENTS

| | | |
|---|---|---|
| JP | 2010-249954 | 11/2010 |
| JP | 2011-17788 | 1/2011 |
| JP | 2011-43623 | 3/2011 |
| JP | 2011-69869 | 4/2011 |
| JP | 2011-164637 | 8/2011 |
| JP | 2012-215853 | 11/2012 |

OTHER PUBLICATIONS

Chinese Office Action dated Nov. 4, 2016 in corresponding Chinese Patent Application No. 201410069643.1 with English translation of Chinese Office Action.

\* cited by examiner

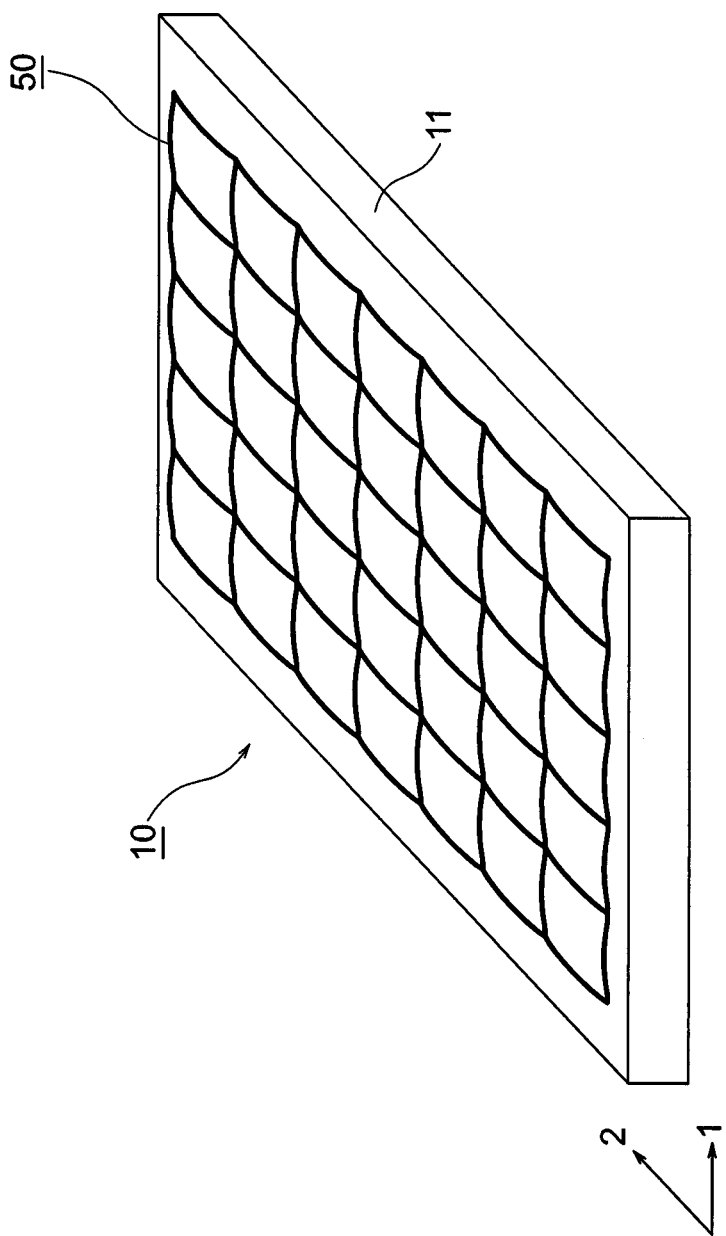

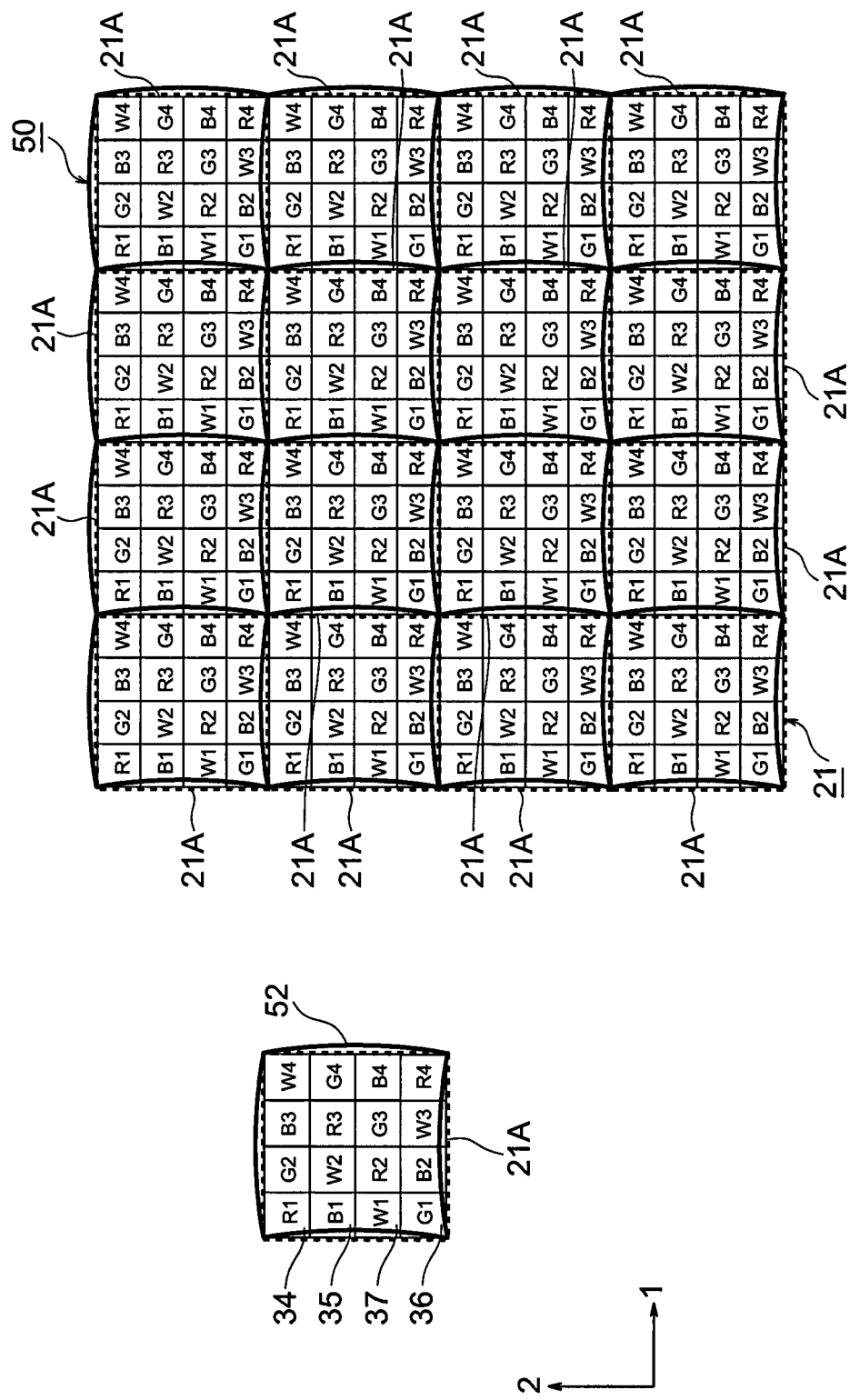

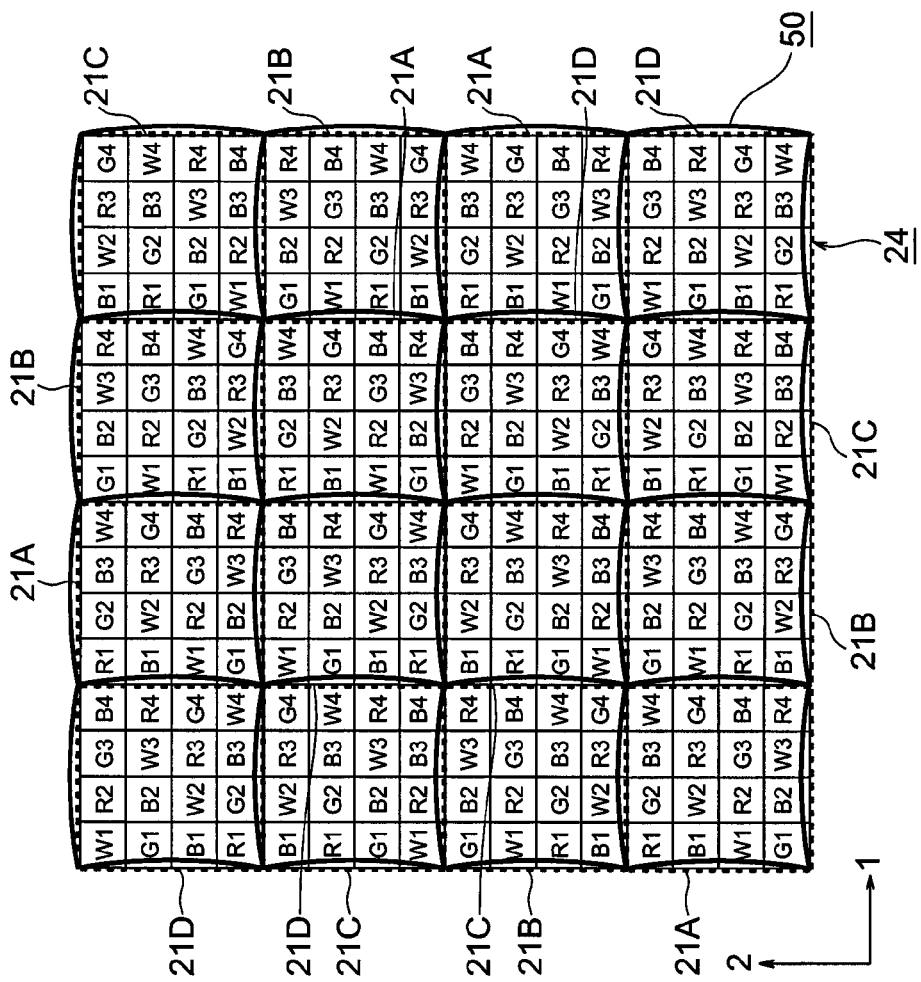

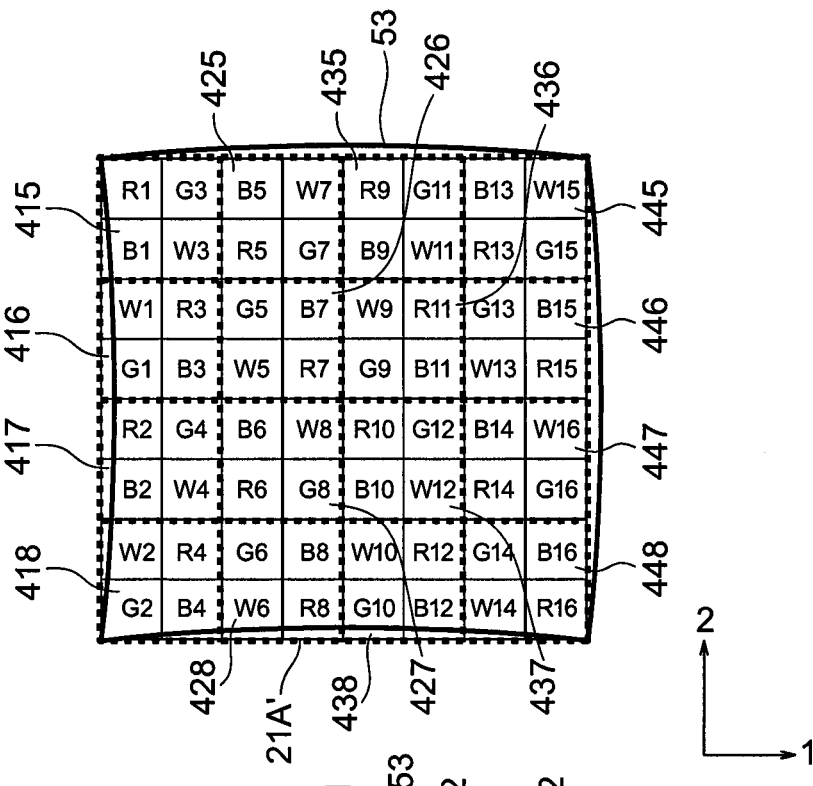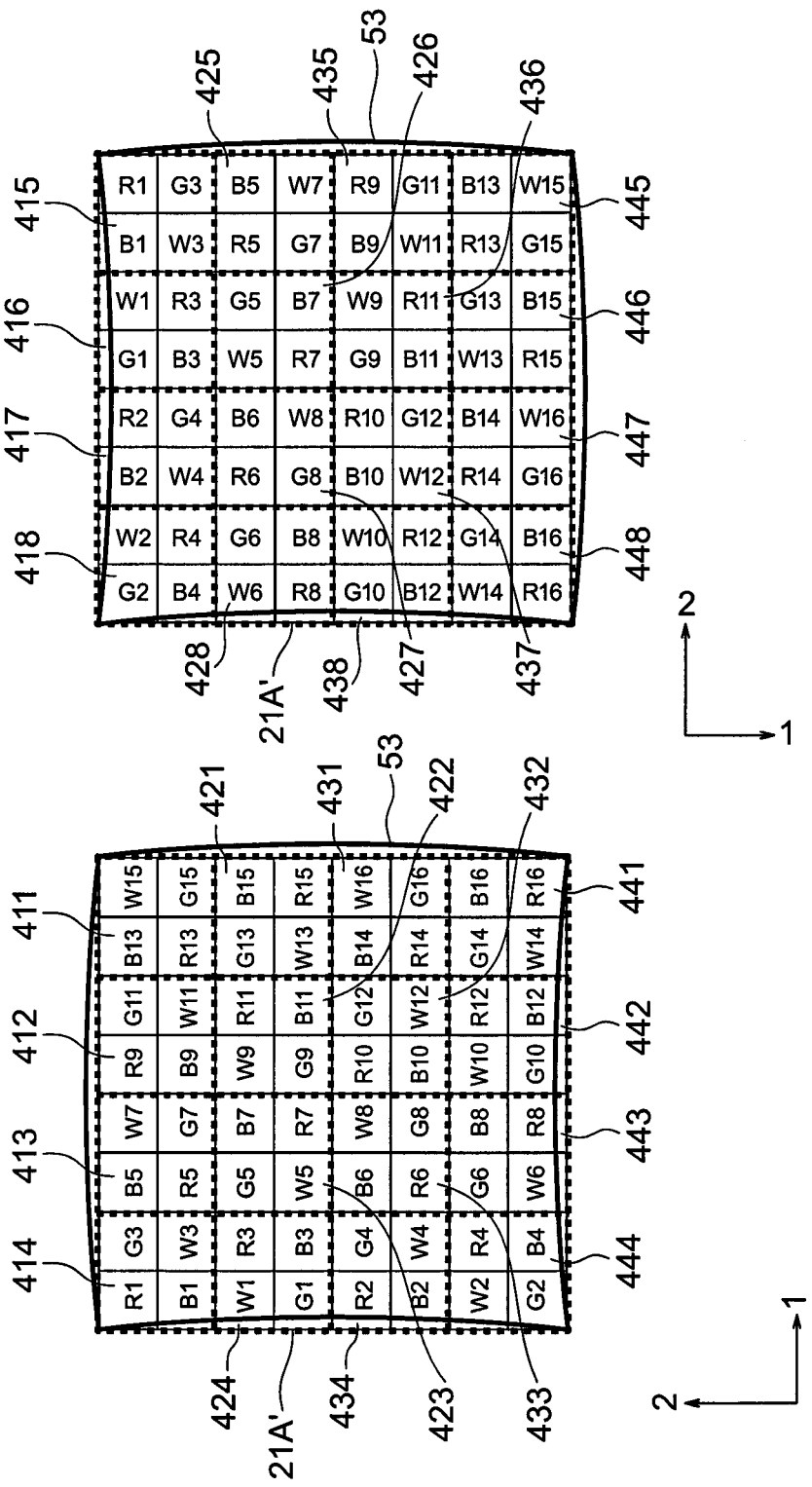

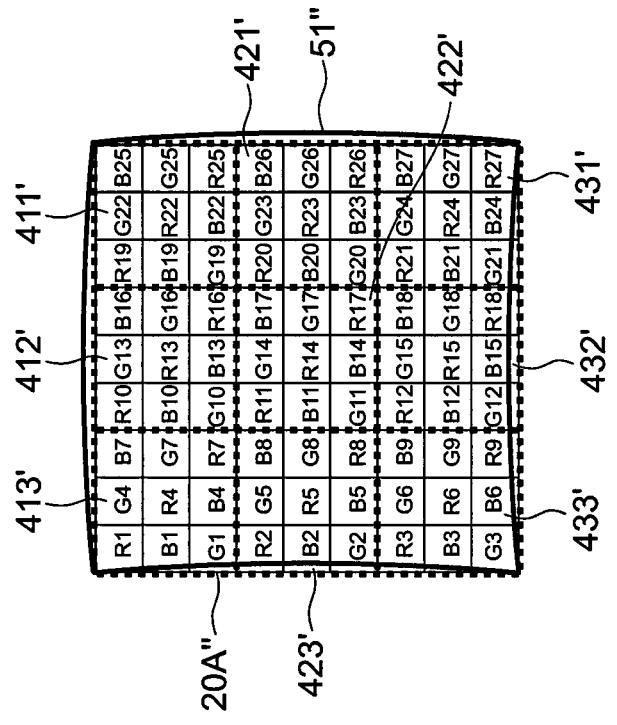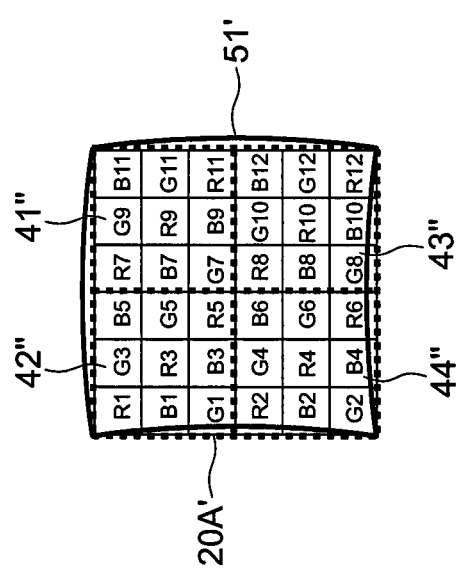

FIG. 23

| EXAMPLES OF PIXEL STRUCTURE | | | A | B | C | D | E | F |
|---|---|---|---|---|---|---|---|---|
| NUMBER OF PRIMARY COLORS | | M | 4 | 4 | 3 | 3 | 2 | 1 |
| HORIZONTAL PARALLAX DISPLAY | NUMBER OF HORIZONTAL VIEWPOINTS | N | 4 | 8 | 6 | 9 | 4 | 4 |
| HORIZONTAL AND VERTICAL PARALLAX DISPLAY | NUMBER OF SUB-PIXELS WITHIN SUB-PIXEL GROUP | PH =N | 4 | 8 | 6 | 9 | 4 | 4 |
| | NUMBER OF SUB-PIXELS IN HORIZONTAL DIRECTION WITHIN SUB-PIXEL GROUP (= NUMBER OF SUB-PIXELS IN VERTICAL DIRECTION) | K K=√M or M | 2 (=√M) | 2 (=√M) | 3 (=M) | 3 (=M) | 2 (=M) | 1 (=√M) |
| | NUMBER OF SUB-PIXELS WITHIN SUB-PIXEL GROUP | PHV PHV=K×K | 4 | 4 | 9 | 9 | 4 | 1 |
| | NUMBER OF HORIZONTAL VIEWPOINTS (= NUMBER OF VERTICAL VIEWPOINTS) | L L=N/K | 2 | 4 | 2 | 3 | 2 | 4 |
| | NUMBER OF TOTAL VIEWPOINTS | J J=L×L | 4 | 16 | 4 | 9 | 4 | 16 |
| REMARKS | | | FIG. 20A FIG. 20B | FIG. 21A FIG. 21B | FIG. 22A | FIG. 22B | | |

SUB-PIXEL GROUP: GROUP OF SUB-PIXELS DISPLAYING A SINGLE-VIEWPOINT IMAGE WITHIN A PIXEL

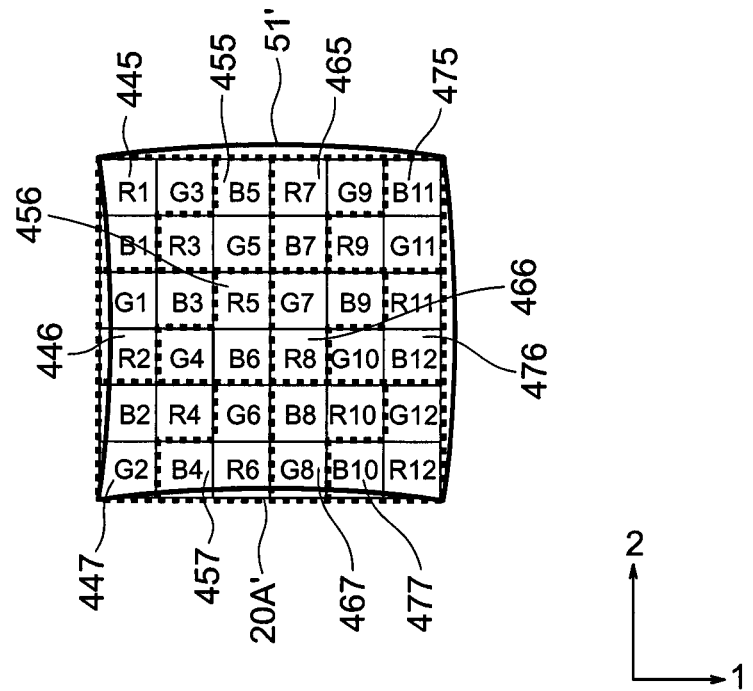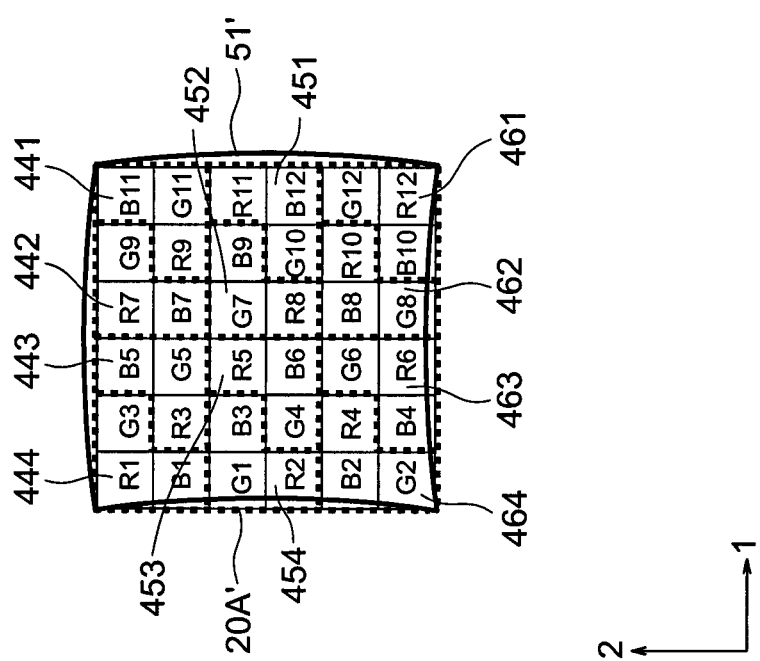

FIG. 26

| Examples of pixel structure | | C | C' | G | G' |
|---|---|---|---|---|---|
| Number of primary colors | M | 3 | 3 | 3 | 3 |
| Number of horizontal viewpoints | N | 6 | 6 | 6 | 6 |
| Number of sub-pixels within sub-pixel group | PH | 6 | 6 | 6 | 6 |
| Number of sub-pixels within sub-pixel group | PHV | 9 | 9 | 3 | 3 |
| Horizontal parallax display — Number of horizontal viewpoints | LH | 2 | 2 | 4 | 3 |
| Horizontal and vertical parallax display — Number of vertical viewpoints | LV | 2 | 2 | 3 | 4 |
| Number of total viewpoints | J | 4 | 4 | 12 | 12 |
| | | FIG. 22A FIRST POSITIONING STATE | FIG. 22A SECOND POSITIONING STATE | FIG. 25A FIRST POSITIONING STATE | FIG. 25B SECOND POSITIONING STATE |
| Remarks | | LH = LV | | LH ≠ LV | |
| | | $J = LH \times LV$ | | $J = LH \times LV = \dfrac{N \times N}{M}$ | |

SUB-PIXEL GROUP: GROUP OF SUB-PIXELS DISPLAYING A SINGLE-VIEWPOINT IMAGE WITHIN A PIXEL

STEREOSCOPIC IMAGE DISPLAY DEVICE, TERMINAL DEVICE AND DISPLAY CONTROLLER

CROSS-REFERENCE TO RELATED APPLICATION

This application is based upon and claims the benefit of priority from Japanese patent application No. 2013-037250, filed on Feb. 27, 2013, and No. 2014-000421, filed on Jan. 6, 2014, the disclosure of which is incorporated herein in its entirety by reference.

BACKGROUND OF THE INVENTION

1. Field of the Invention

The present invention relates to an image display device. More specifically, the present invention relates to a stereoscopic image display device and a terminal device capable of displaying stereoscopic images according to the positioning state of the device.

2. Description of the Related Art

Conventionally, there has been introduced a stereoscopic image display device with which stereopsis can be achieved without using eyeglasses by projecting images of different parallax to the left and right eyes of an observer by providing different images towards a plurality of viewpoints.

As a stereoscopic image display method used in such device, known is a method with which image data for each viewpoint are synthesized and displayed on a display unit, and the displayed synthesized image is separated by an optical separation module constituted with a lens or a barrier (a light-shielding plate) having a slit and separated images are provided to each of the viewpoints, i.e., to the left and right eyes of the observer.

As the optical separation module, this method generally employs a parallax barrier constituted with a barrier having a great number of stripe-patterned slits or a lenticular lens in which cylindrical lenses exhibiting the lens effect in one direction are arranged.

Further, there have been proposed various kinds of display devices which employ image distribution modules (also referred to as optical separation modules hereinafter) which are capable of performing optical image separation not only in a first direction that is the normal observing direction but also in a second direction that is orthogonal to the first direction (e.g., Japanese Unexamined Patent Publication 2011-17788 (Patent Document 1); Japanese Unexamined Patent Publication 2011-43623 (Patent Document 2); Japanese Unexamined Patent Publication 2011-69869 (Patent Document 3); Japanese Unexamined Patent Publication 2010-249954 (Patent Document 4); Japanese Unexamined Patent Publication 2011-164637 (Patent Document 5); Japanese Unexamined Patent Publication 2012-215853 (Patent Document 6)). That is, the use of such an image separation module makes it possible to project images of different parallax to the left and right eyes of the observer even when the layout direction of the device is rotated by 90 degrees from the normal observing direction and the display image is changed to fit to that layout, so that the stereoscopic image can be visually recognized from two directions.

In Patent Documents 1 to 3, disclosed is a display device which makes it possible to visually recognize stereoscopic images under two conditions where the layout directions are different by 90 degrees from each other by using an oblique step type, a zigzag type, or a pinhole type parallax barrier as an optical separation module by using generally-used vertically RGB striped rectangular sub-pixels as the base.

Further, Patent Document 4 discloses a display device which makes it possible to visually recognize stereoscopic images in both cases where the layout directions are different by 90 degrees from each other by way of disposing vertical RGB strip rectangular sub-pixels obliquely and using a lens array element as the optical separation module.

Further, Patent Document 5 discloses a display device which makes it possible to visually recognize stereoscopic images in two cases where the layout directions are different by 90 degrees from each other by employing a structure in which pixel matrixes each constituted with same-color pixels arranged in a 2×2 matrix form, for example, are repeatedly arranged in the horizontal direction and the vertical direction in a manner to be of different colors from each other and an optical separation module is provided by corresponding to each of the pixel matrixes.

Further, Patent Document 6 discloses a display device which employs a structure in which sub-pixels are arranged repeatedly in the horizontal direction and the vertical direction in a manner to be in different colors from each other in a pixel constituted with sub-pixels of three colors arranged in a 3×3 matrix form, for example, and a parallax barrier as an optical separation module is provided to each of the pixels in a corresponding manner. Herein disclosed is technical content which makes it possible to visually recognize stereoscopic images in both of the two cases where the layout directions are different by 90 degrees from each other by suppressing generation of crosstalk by decreasing the display area occupying the pixels by providing displays on three sub-pixels out of nine sub-pixels of each pixel, by not providing displays on the other six sub-pixels, and by employing the square-shape sub-pixels. However, with the structures of the display devices disclosed in Patent Documents 1 to 3, there is a layout direction with which the light-ray separating directions separated by the optical separation module becomes parallel to the RGB layout direction. In the layout direction, a so-called "color moiré" occurs, i.e., unevenness in each color when the observer shakes the viewing angle, such that the display quality is greatly deteriorated.

Further, those display devices employ parallax barriers of a great versatility in patterning as the optical separation modules, so that there is an issue of having large deterioration in the transmittance due to loss of light (deterioration in the brightness of the display screen) caused by the light-shielding parts of the parallax barriers. In the meantime, in the case where a lens is employed instead of the parallax barrier to correspond to the layout pattern of the pixels disclosed in Patent Documents 1 to 3, inconveniences result in terms of readiness and cost of manufacture. Therefore, it is not possible to overcome a large issue of deterioration in the transmittance of the parallax barrier.

In the structure of the stereoscopic image display device disclosed in Patent Document 4, there is no layout direction where the direction of light-ray separation done by the optical separation module becomes parallel to the RGB color layout direction. Thus, it is possible to lighten the "color moiré" that is at issue in the technical contents of Patent Documents 1 to 3 described above.

However, pitches of the rectangular sub-pixels of that structure are different in the horizontal direction and the vertical direction. Thereby, color moiré and luminance unevenness occur when the layout direction of the device is changed, so that the 3D resolution and the like vary depending on the layout directions.

Further, while the lenticular lens when the long sides of the rectangular sub-pixels are along the horizontal direction is arranged in the vertical direction, the lenticular lens when the long sides of the rectangular sub-pixels are in the vertical direction is arranged by being tilted with respect to the vertical direction. Thus, a sense of jaggies (serration) in increased, due to the oblique lens.

In the structure of the stereoscopic image display device disclosed in Patent Document 5, there is also no layout direction where the direction of light-ray separation done by the optical separation module becomes parallel to the RGB color layout direction. Thus, it is also possible to lighten the "color moiré".

However, the resolution in the vertical direction becomes half the resolution in the horizontal direction. Because of that, degrees of resolution in the vertical and lateral directions become inconsistent.

In the structure of the stereoscopic image display device disclosed in Patent Document 6, there is also no layout direction where the direction of light-ray separation done by the optical separation module becomes parallel to the RGB color layout direction. Thus, it is also possible to lighten the "color moiré".

However, in addition to the fact that it is necessary to use two pixels for achieving stereoscopic display, the number of sub-pixels contributed to the display among the number of sub-pixels constituting each pixel is ⅓ to ¼ that is a reciprocal of the number of primary colors. Thus, not only the 3D display resolution is deteriorated but also the power consumption is increased due to the low use efficiency of the sub-pixels and due to the deterioration in the transmittance caused by light loss caused by the barrier.

It is therefore an exemplary object of the present invention to improve the inconveniences of the above-described conventional cases and, more specifically, to provide a stereoscopic image display device, a stereoscopic image display method, and a program therefore capable of displaying significant stereoscopic images with no difference in the degree of resolution in the vertical and lateral directions and having almost no deterioration in the transmittance regardless of the positioning state of the device.

SUMMARY OF THE INVENTION

In order to achieve the foregoing object, the stereoscopic image display device according to the present invention employs a structure which includes: a display panel in which pixels, each constituted with N×N pieces (N is a natural number of 2 or larger) of sub-pixels colored in M (M is a natural number of 1 or larger) primary colors, are arranged as a matrix; and an optical separation module in which optical elements which distribute exit light from each of the pixels according to parallax images in a first direction and a second direction along a layout of the pixels are arranged to correspond to each of the pixels, wherein: the sub-pixels neighboring each other within each of the pixels are of different colors from each other; array pitches of the sub-pixels are uniform in the first and second directions; same numbers of the parallax images are displayed for each of the first direction and the second direction within each of the pixels; and numbers of the sub-pixels in different colors within the parallax images are equivalent.

Further, the terminal device according to the present invention is characterized to include the stereoscopic image display device and a casing which houses the stereoscopic image display device inside thereof.

Furthermore, the display controller according to the present invention is a display controller for controlling actions of a stereoscopic image display device which includes a display panel in which pixels each constituted with N×N pieces (N is a natural number of 2 or larger) of sub-pixels colored in M (M is a natural number of 1 or larger) primary colors are arranged as a matrix, and an optical separation module in which optical elements which distribute exit light from each of the pixels according to parallax images in a first direction and a second direction along layout of the pixels are arranged to correspond to each of the pixels, and the display controller employs a structure which includes: a detection unit which detects displacement of a device main body including the display panel; a judging unit which judges whether or not both eyes of an observer are located within a stereopsis region set in advance based on displacement information detected by the detection unit; an image generating unit which generates images having parallax of the N viewpoints when the judging unit judges that both eyes are located within the region; and a display panel driving unit which outputs the images generated by the image generating unit to the display panel, wherein the image generating unit: sets the sub-pixels neighboring to each other within each of the pixels to be of different colors from each other; sets array pitches of the sub-pixels to be uniform in the first and second directions; displays same numbers of the parallax images for each of the first direction and the second direction within each of the pixels; and sets numbers of the sub-pixels in different colors within the parallax images to be equivalent.

BRIEF DESCRIPTION OF THE DRAWINGS

FIG. 1 is a schematic diagram showing the structure of a stereoscopic image display device according to a first exemplary embodiment of the present invention;

FIGS. 2A and 2B show fragmentally extracted illustrations of pixels and lens array elements arranged on a display panel of the stereoscopic image display device disclosed in FIG. 1, in which FIG. 2A is a diagram showing a layout relation constituted between the pixel constituted with 3×3 sub-pixels and the lens array element, and FIG. 2B is a diagram showing a pixel matrix in which the pixels of FIG. 2A and the lens array elements are arranged as a matrix;

FIGS. 3A and 3B show illustrations of pixels in which sub-pixels each constituted with three primary colors are arranged as a matrix, in which FIG. 3A is a diagram showing a pixel constituted with 6×6 sub-pixels and FIG. 3B is a pixel constituted with 9×9 sub-pixels;

FIGS. 4A and 4B show illustrations of pixels in which sub-pixels each constituted with four primary colors are arranged as a matrix, in which FIG. 4A is a diagram showing a pixel constituted with 4×4 sub-pixels, and FIG. 4B is a diagram showing a pixel matrix in which the pixels of FIG. 4A and the lens array elements are arranged as a matrix;

FIGS. 7A-7D show an example of image information inputted to the sub-pixels disclosed in FIG. 4A, in which FIG. 7A is an image corresponding to a first-viewpoint image, FIG. 7B is an image corresponding to a second-viewpoint image, FIG. 7C is an image corresponding to a third-viewpoint image, and FIG. 7D is an image corresponding to a fourth-viewpoint image;

FIGS. 12A-12C show illustrations regarding a terminal device that uses the stereoscopic image display device according to the exemplary embodiment of the present invention, in which FIG. 12A shows a first positioning state, FIG. 12B shows a second positioning state, and FIG. 12C shows a state not corresponding to any of the above-described states;

FIGS. 15A and 15B show fragmentally extracted illustrations of a stereoscopic image display device according to a second exemplary embodiment of the present invention, in which FIG. 15A is a diagram showing a state where pixels each constituted with 3×3 sub-pixels and the lens array elements are arranged as a matrix, and FIG. 15B is a diagram which clearly shows the layout of the pixels for each color layout pattern;

FIGS. 16A and 16B show partially extracted illustrations of the stereoscopic image display device according to the second exemplary embodiment of the present invention, in which FIG. 16A is a diagram showing a state where pixels each constituted with 4×4 sub-pixels and the lens array elements are arranged as a matrix and FIG. 16B is a diagram which clearly shows the layout of the pixels for each color layout pattern;

FIGS. 19A-19D show an example of image information inputted to each of the sub-pixels (each group of the sub-pixels) based on the structure of the 4×4 sub-pixels disclosed in FIG. 4A according to a stereoscopic image display device according to a fourth exemplary embodiment of the present invention, in which FIG. 19A is an image corresponding to a first-viewpoint image, FIG. 19B is an image corresponding to a second-viewpoint image, FIG. 19C is an image corresponding to a third-viewpoint image, and FIG. 19D is an image corresponding to a fourth-viewpoint image;

FIGS. 20A and 20B show the pixels having the structure of 4×4 sub-pixels and the lens array elements disclosed in FIG. 4A, in which FIG. 20A is a diagram showing the relation between the input image and the sub-pixels (the groups of sub-pixels) in the first positioning state, and FIG. 20B is a diagram showing the relation between the input image and the sub-pixels (the groups of sub-pixels) in the second positioning state;

FIGS. 21A and 21B show the pixels having the structure of 8×8 sub-pixels and the lens array elements disclosed in FIG. 5, in which FIG. 21A is a diagram showing the relation between the input image and the sub-pixels (the groups of sub-pixels) in the first positioning state, and FIG. 20B is a diagram showing the relation between the input image and the sub-pixels (the groups of sub-pixels) in the second positioning state;

FIGS. 22A and 22B show illustrations of pixels in which sub-pixels constituted with three primary colors are arranged as a matrix, in which FIG. 22A is a diagram showing the pixel having the structure of 6×6 sub-pixels constituted with groups of 3×3 sub-pixels, and FIG. 22B is a diagram showing the pixel having the structure of 9×9 sub-pixels constituted with groups of 3×3 sub-pixels;

FIG. 23 is a table showing the relations regarding the number of primary colors, the number of viewpoints, and the number of sub-pixels in the stereoscopic image display device according to the fourth exemplary embodiment of the present invention;

FIGS. 25A and 25B show the pixels having the structure of 6×6 sub-pixels and the lens array elements disclosed in FIG. 3A, in which FIG. 25A is a diagram showing the relation between the input image and the sub-pixels (the groups of sub-pixels) in the first positioning state, and FIG. 25B is a diagram showing the relation between the input image and the sub-pixels (the groups of sub-pixels) in the second positioning state;

FIG. 26 is a table showing the relations regarding the number of primary colors, the number of viewpoints, and the number of sub-pixels in a stereoscopic image display device according to a fifth exemplary embodiment of the present invention;

FIGS. 28A and 28B show fragmentary sectional views showing a part of sections taken along a line A-A of FIG. 27, in which FIG. 28A is a diagram showing a state where each lens circumference flat part is bonded by an adhesive agent or a sticky agent, and FIG. 28B is a diagram showing a state where each lens circumference flat part is directly bonded by a material exhibiting adhesiveness or stickiness;

FIGS. 29A and 29B show fragmentally extracted illustrations of the structure regarding the stereoscopic image display device disclosed in FIG. 27, in which FIG. 29A is a diagram showing the layout relation between the pixel having the structure of 4×4 sub-pixels and the lens array element corresponding thereto (a part of the optical separation module constituted with two lenticular lens substrates), and FIG. 29B is a diagram showing the corresponding relation between a pixel matrix in which the above-described pixels are arranged as a matrix and an optical separation module.

DETAILED DESCRIPTION OF THE PREFERRED EMBODIMENTS

First Exemplary Embodiment

Figure 2B:
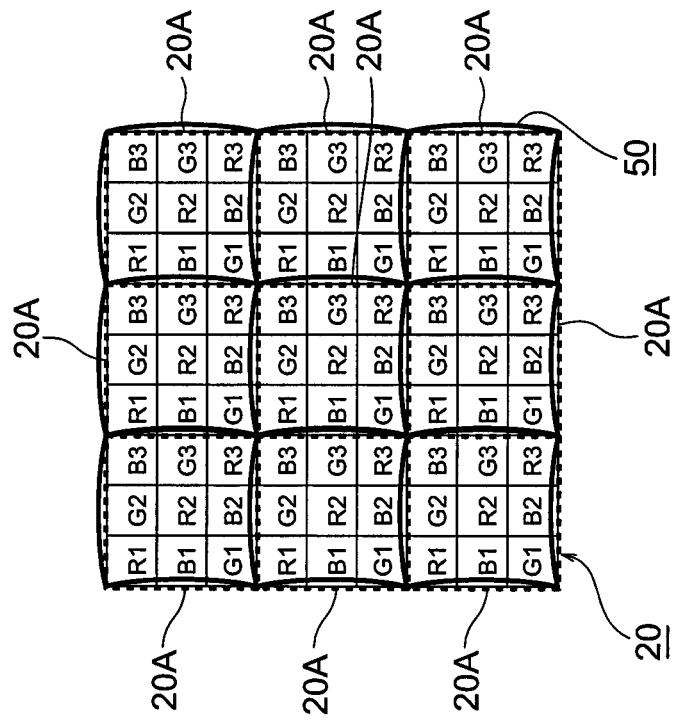

A first exemplary embodiment of an image display device according to the present invention will be described by referring to FIG. 1 to FIG. 13.
(Overall Structure)

In FIG. 1, reference numeral 10 is a stereoscopic image display device which displays parallax images and the like according to its positioning state.

The stereoscopic image display device 10 includes: a display panel 11 in which pixels (not shown) are arranged as a matrix; and an optical separation module 50 provided on a display surface side of the display panel 11 to correspond to each of the pixels.

Arrows and reference numerals 1 and 2 located at the tip points thereof shown in FIG. 1 indicate two directions on a plane parallel to the display surface of the display panel 11 on a space where the image display device 10 is arranged. That is, "1" and "2" indicate a first direction that is the lateral direction of the display panel and a second direction that is vertical with respect to it (the first direction and the second direction along the layout of the pixels).

Further, the stereoscopic image display device 10 is capable of providing stereoscopic image display in two states, i.e., a first positioning state where the first direction is set as a substantially horizontal direction and in a second positioning state where the second direction is set as a substantially horizontal direction. That is, an optical separation module 50 is structured to be able to separate light rays towards the directions according to the respective horizontal directions in the two states.

Note here that the horizontal direction is defined as the direction that is parallel to a straight line connecting between the left eye and the right eye of the observer, and this applies also in the explanations provided hereinafter.

As the display panel 11, various electro-optical elements such as a liquid crystal display element, an organic electroluminescence display element, an electrophoretic element, an electro chromic element, and the like can be used.

Further, as the optical separation module 50, it is possible to use an optical element such as a fly-eye lens, a parallax barrier, or a liquid crystal lens having a refractive index anisotropy and also an electro-optical element such as a liquid crystal lens having a function of controlling the refractive index based on electric signals or a liquid crystal barrier having a light-shield control function. In terms of the transmittance, it is preferable to use the fly-eye lens or the liquid crystal lens.

Next, the layout relation between each pixel on the above-described display panel 11 and the optical separation module 50 will be described by referring to FIG. 2. The first exemplary embodiment employs the fly-eye lens as the optical separation module 50, so that the optical separation module 50 is referred to as a lens array 50 for convenience in the explanations provided hereinafter.

Figure 2A:
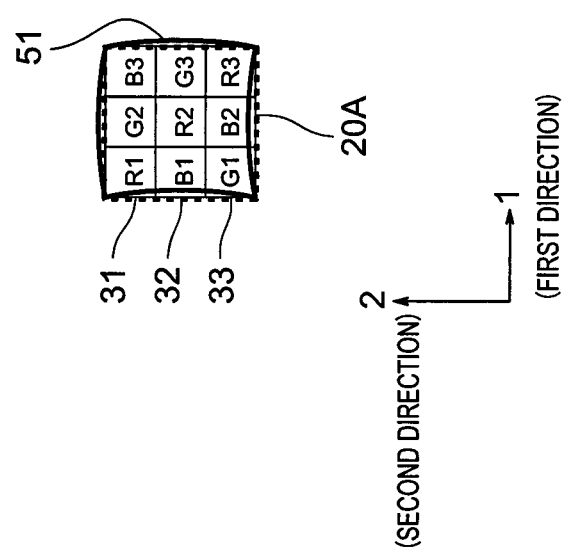

As shown in FIG. 2A, a pixel 20A constituted with a red sub-pixel 31, a blue sub-pixel 32, and a green sub-pixel 33 of three primary colors has 3×3 sub-pixels therein.

Note here that the 3×3 sub-pixels provided in a single pixel 20A are arranged in such a manner that the color layout of each primary color in both the first and second direction is different and does not overlap with each other. In the first exemplary embodiment, it is so designed that the color layout of each primary color becomes different from each other by arranging R1, R2, R3 as the red sub-pixels 31, B1, B2, B3 as the blue sub-pixels 32, and G1, G2, G3 as the green sub-pixels 33 in the manner as shown in FIG. 2A.

Further, each of the pixels 20A and lens array elements 51 as the optical elements corresponding to each pixel are arranged to be parallel to each other and at a same pitch in the first and the second direction. Furthermore, the first exemplary embodiment employs the structure where the layout regarding all the sub-pixels constituting each of the pixels 20A on the display panel 11 is the same.

Note here that a group of the pixels 20A arranged as a matrix is referred to as a pixel matrix 20.

Each of the lens array elements 51 constituting the lens array 50 is arranged at the position corresponding to each pixel 20A, so that light can be distributed to directions of three viewpoints in both the first and second directions. Specifically, as shown in FIG. 2B, each of the pixels 20A and each of the lens array elements 51 corresponds to each other, and both are arranged as a matrix.

Figure 3B:
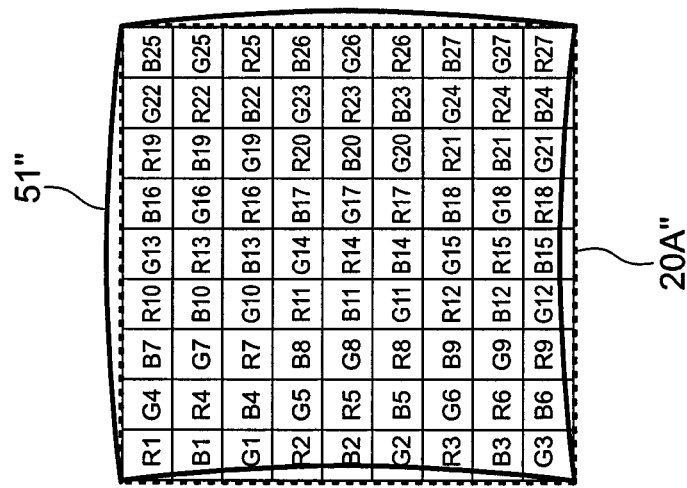
Figure 3A:
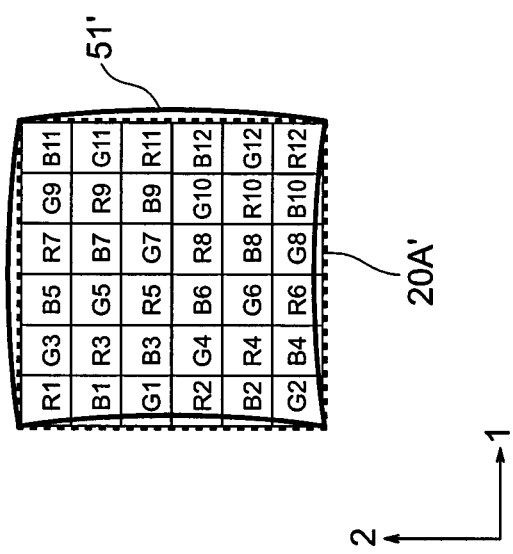

Further, instead of the pixel 20A shown in FIG. 2, it is also possible to employ a pixel 20A' in which the sub-pixels constituted with three primary colors are arranged to be in a 6×6 form as shown in FIG. 3A, a pixel 20A" in which the same sub-pixels are arranged to be in a 9×9 form as shown in FIG. 3B, or the like. In addition, those pixels 20A' (6×6), the pixel 20A" (9×9), and the like also employ the structure where each of the primary colors is arranged not to overlap with each other in the first and second directions and the array pitches of the sub-pixels are uniform in the first and second directions as shown in FIG. 3.

Thereby, the lens array elements 51' and 51" can distribute the exit light from each of the pixels effectively towards the directions of the six viewpoints (in the case of the pixel 20A') or the nine viewpoints (in the case of the pixel 20A") in both the first and second directions, as in the case of the lens array element 51 for the pixel 20A (3×3).

Therefore, in the same manner as described above, it is possible to employ the structure capable of effectively distributing the exit light for the viewpoints in the number that is the multiple of "3" that is the number of the primary colors for the image display device 10 as appropriate.

Next, by referring to FIG. 4, the layout relation between each pixel constituted with four primary colors and the lens array 50 will be described.

As shown in FIG. 4A, a pixel 21A constituted with a red sub-pixel 34, a blue sub-pixel 35, a green sub-pixel 36, and a white sub-pixel 37 of four primary colors includes 4×4 sub-pixels therein.

Regarding the 4×4 sub-pixels provided in a single pixel 21A are also arranged in such a manner that the color layout of each primary color in both the first and second directions is different and does not overlap with each other. In this case, it is so designed that the color layout of each primary color becomes different from each other by arranging R1, R2, R3, R4 as the red sub-pixels 41, B1, B2, B3, B4 as the blue sub-pixels 35, G1, G2, G3, G4 as the green sub-pixels 36, and W1, W2, W3, W4 as the white sub-pixels 37 in the manner shown in FIG. 4A so that each of the primary colors does not overlap with each other.

Further, the layout of the sub-pixels constituting each of the pixels 21A provided on the display panel 11 is in common to all the pixels 21A as shown in FIG. 4B.

Note here that a group of the pixels 21A arranged as a matrix is referred to as a pixel matrix 21.

Each of the lens array elements 52 constituting the lens array 50 is arranged at the position corresponding to each of the pixels 21A as shown in FIG. 4B. Thereby, the exit light can be distributed in the directions of four viewpoints in both the first and the second directions. That is, each of the pixels 21A and each of the lens array elements 52 correspond to each other, and both are arranged as a matrix. As in the explanations provided above by referring to FIG. 2, the pixels 21A and the lens array elements 52 are arranged parallel to each other and at the same pitches in the first and second directions.

Figure 5:
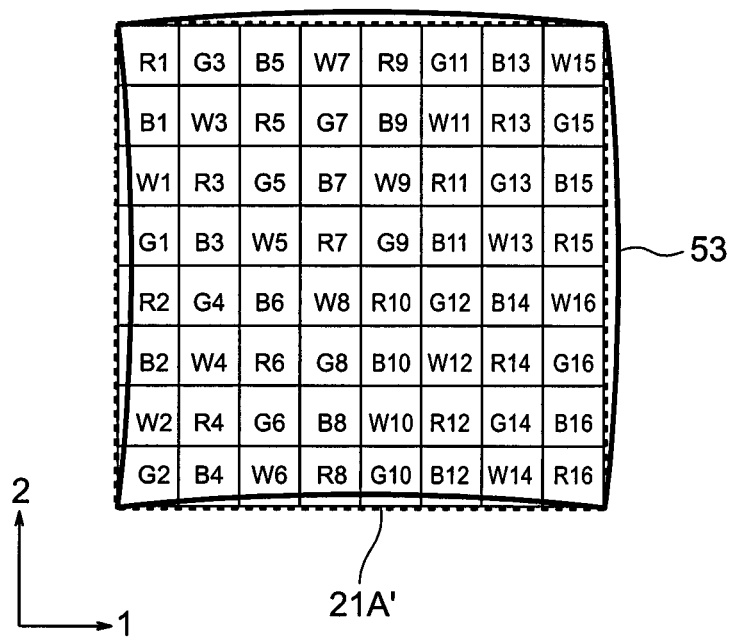
FIG. 5 shows a pixel constituted with 8×8 sub-pixels of four primary colors.

Further, instead of the pixel 21A shown in FIG. 4, it is also possible to employ the pixel 21A' or the like in which the sub-pixels constituted with four primary colors are arranged in a form of 8×8 as shown in FIG. 5 for the display panel 11. The pixel 21A' and the like also employ the structure where each of the primary colors is arranged not to overlap with each other in the first and second directions and the array pitches of the sub-pixels are uniform in the first and second directions as shown in FIG. 5.

Thereby, the lens array element 53 can effectively distribute the exit light for the directions of eight viewpoints in both the first and the second directions as in the case of the lens array element 52 for the pixel 21A (4×4).

Therefore, in the same manner as described above, it is possible to employ the structure capable of effectively distributing the exit light for the viewpoints in the number that is the multiple of "4" that is the number of the primary colors for the image display device 10 as appropriate.

The structures of the sub-pixels and the pixels according to the first exemplary embodiment shown in FIG. 2 to FIG. 5 can be generally expressed as follows by using a natural number M and using N (natural number of 2 or larger) that is a multiple of M.

In a case where a sub-pixel constituted with M primary colors, the first exemplary embodiment is so structured that the number of the sub-pixels constituting each pixel is a square of N (N viewpoints×N viewpoints) and a remainder when N is divided by M is 0 (N mod M=0). Further, it is structured that neighboring sub-pixels for two optically isolating directions in each pixel are not of a same color. Furthermore, in each pixel, the existence probability of the same-color sub-pixels in the two optically isolating directions is the same for all the M primary colors and the array pitches of the sub-pixels for the two optically isolating directions are equivalent.

Further, while the explanations are provided by using RGB (red, green, and blue) for the sub-pixels of 3×3 and by using RGBW (red, green, blue, and white) for the sub-pixels of 4×4 in the above, the primary colors to be employed are not limited only to those colors. For example, CMY (cyan, magenta, yellow) may be employed instead of RGB, and RGBY (red, green, blue, yellow) or the like may also be employed instead of RGBW. Further, fluorescent colors, pearl colors, or interference colors may be employed as well.

Further, the number M of the primary colors may be 1. In that case, provided is a monochrome display. Since a remainder when N is divided by M is always 0 (N mod M=0), the number N of the viewpoints (N-viewpoints) is not limited to any numbers.

While the case where the first direction and the second direction are in an orthogonal relation has been described in each of the examples described above, the relation between each of the directions is not limited only to such relation. That is, even in a case where the first direction and the second direction are not in the orthogonal relation, the pixels constituted with the sub-pixels and the lens array elements corresponding thereto can be applied and the same operational effects can be acquired thereby.

Figure 6:
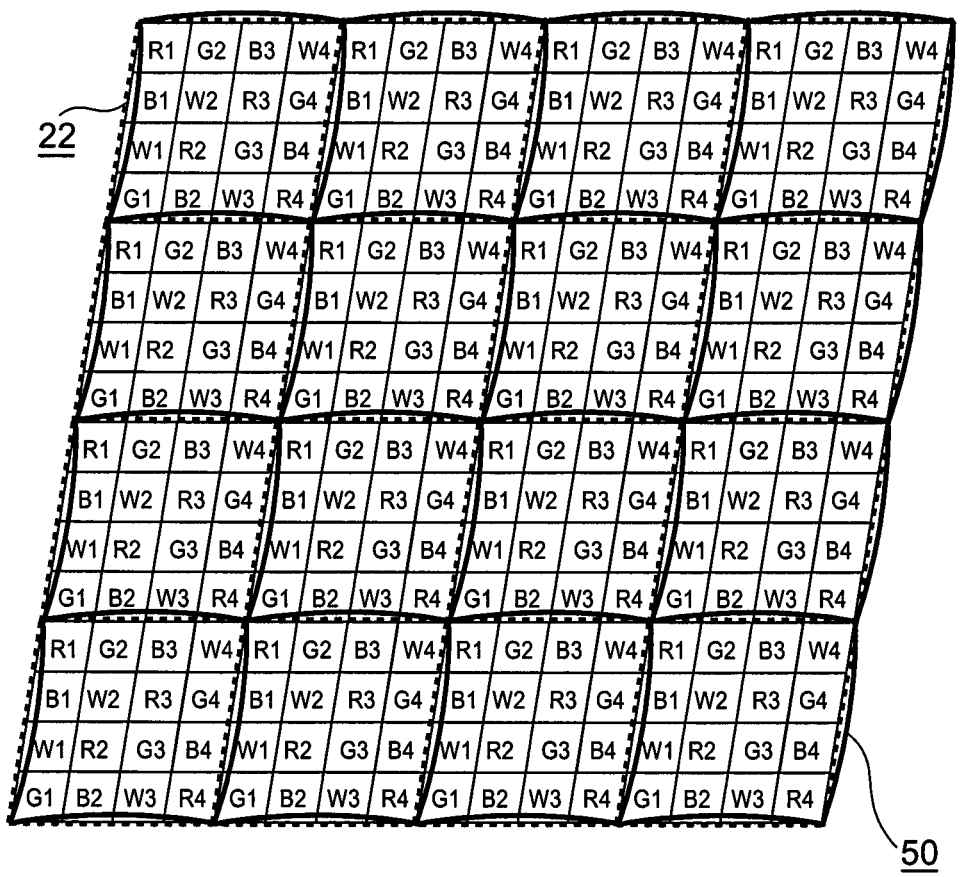
FIG. 6 is a diagram showing a case where a first direction and a second direction are not in an orthogonal relation with respect to the matrix pixel layout disclosed in FIG. 4A.

FIG. 6 shows an example of each pixel, the lens array 50, and the layout relation of those in a case where the first direction and the second direction are not in the orthogonal relation. A pixel matrix 22 constituted with rhombic pixels shown herein is structured to be in a rhombic form as a whole by providing a specific tilt with respect to the matrix pixel layout shown in FIG. 4B. The first direction and the second direction shown in FIG. 6 also show the directions along the layout of the pixels.

In such case, as shown in FIG. 6, it is possible to employ the structure in which the pixel matrix 22 and the lens array 50 are arranged parallel and at the same pitches in the first and the second directions, respectively. Therefore, the structure can be applied to a stereoscopic image display device whose external shape has a non-rectangular design characteristic. That is, the structure in such nonlinear orthogonal relation becomes effective, so that the applicable range for the device can be expanded.

Figure 7:
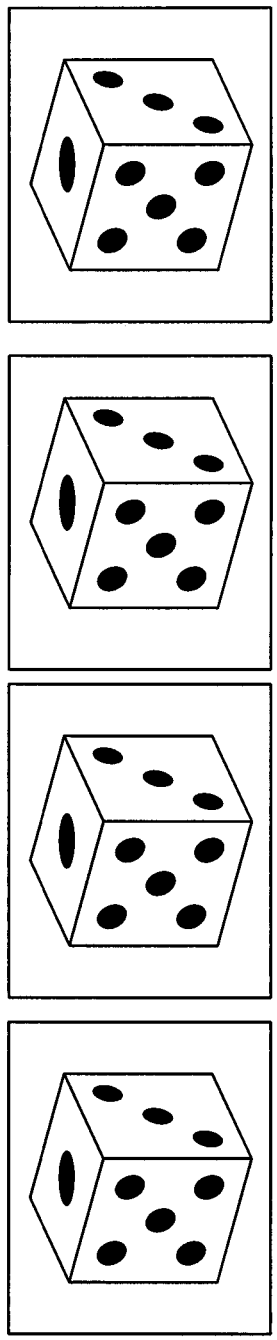

Subsequently, FIG. 7 shows an example of image information inputted to each sub-pixel in the structure (the structure of 4×4 sub-pixels) constituted with the 4×4 sub-pixels of the four primary colors shown in FIG. 4A. FIG. 7A corresponds to a first viewpoint image, FIG. 7B corresponds to a second viewpoint image, FIG. 7C corresponds to a third viewpoint image, and FIG. 7D corresponds to a fourth viewpoint image.

As shown in FIG. 7, there is a characteristic point in the difference between the size of the face of "5" and the size of the face of "3" of a dice among each of the viewpoint images. This allows the user to visually recognize a significant stereoscopic image.

Next, the relation between the input image and the sub-pixels as well as the structures thereof in the first positioning state where the first direction is set as the horizontal direction will be described by referring to FIG. 8 which shows the structures (the pixel 21A and the lens array element 52) and the layout relation same as those of FIG. 4.

Here, the pixel 21A shown in FIG. 4 is arranged as a structure constituted with a sub-pixel group 41 in which sub-pixels W4, G4, B4, and R4 are arranged, a sub-pixel group 42 in which sub-pixels B3, R3, G3, and W3 are arranged, a sub-pixel group 43 in which sub-pixels G2, W2, R2, and B2 are arranged, and a sub-pixel group 44 in which sub-pixels R1, B1, W1, and G1 are arranged.

Figure 8:
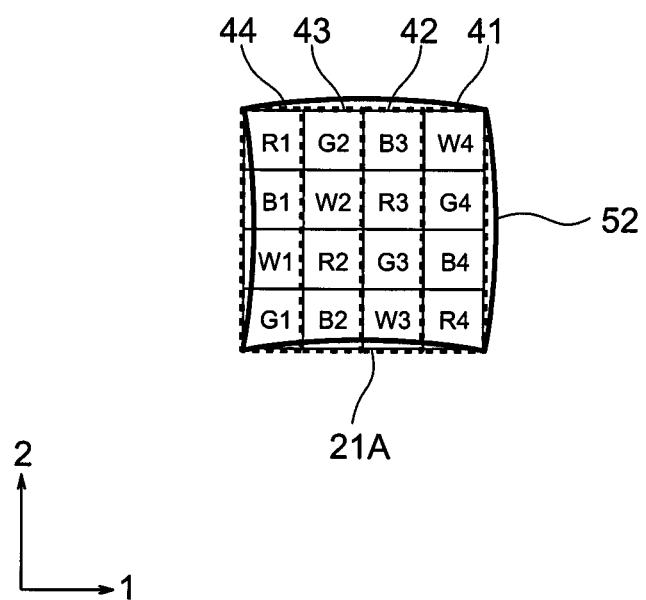
FIG. 8 is a diagram showing the relation between an input image and sub-pixels (a group of sub-pixels) regarding a pixel in the structure of 4×4 sub-pixels and the lens array element in a first positioning state disclosed in FIG. 4A.

That is, it is so structured that signals corresponding to the first viewpoint image, the second viewpoint image, the third viewpoint image, and the fourth viewpoint image are inputted to the respective sub-pixel groups 41, 42, 43, and 44 shown in FIG. 8 for the input image shown in FIG. 7. At that time, all of the sub-pixel groups 41 to 44 are constituted with the four primary colors, so that it is possible to acquire such an effect that there is no difference generated in the number of displayed colors among each of the viewpoint images within a pixel.

Figure 9:
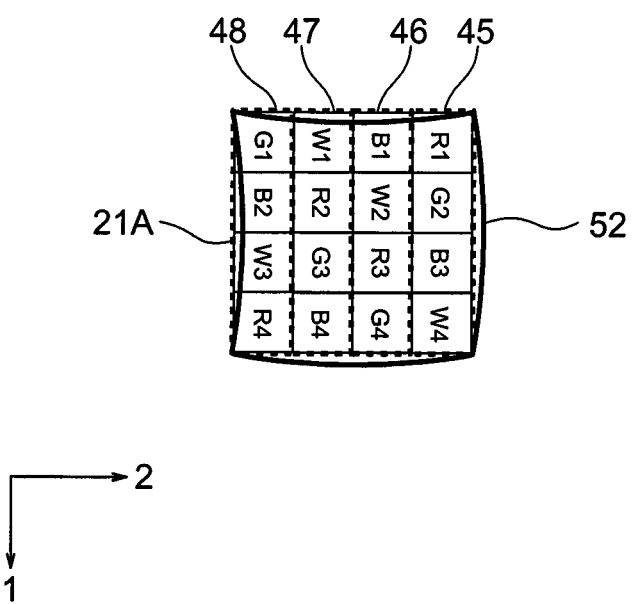
FIG. 9 is a diagram showing the relation between an input image and sub-pixels (a group of sub-pixels) when the pixel in the structure of 4×4 sub-pixels and the lens array element disclosed in FIG. 8 are rotated clockwise by 90 degrees.

FIG. 9 shows the relation between each of the viewpoint images and the sub-pixels in the second state where the second direction is set as the horizontal direction which is a state rotated clockwise by 90 degrees from the first positioning state shown in FIG. 8.

The pixel 21A opposing to the lens array element 52 in such case rotates according to the rotation of the display panel 11 (the stereoscopic image display device 10), so that the pixel 21A in this case is functioned as the structure constituted with a sub-pixel group 45 in which sub-pixels R1, G2, B3, and W4 are arranged, a sub-pixel group 46 in which sub-pixels B1, W2, R3, and G4 are arranged, a sub-pixel group 47 in which sub-pixels W1, R2, G3, and B4 are arranged, and a sub-pixel group 48 in which sub-pixels G1, B2, W3, and R4 are arranged.

That is, as in the case of the first positioning state (FIG. 8), it is so structured that signals corresponding to the first viewpoint image, the second viewpoint image, the third viewpoint image, and the fourth viewpoint image are inputted to the respective sub-pixel groups 45, 46, 47, and 48 shown in FIG. 9 for the input images shown in FIG. 7. At that time, all of the sub-pixel groups 45 to 48 are constituted with the four primary colors, so that it is possible to acquire such an effect that there is no difference generated in the number of displayed colors among each of the viewpoint images within a pixel.

Therefore, as shown in FIG. 8 and FIG. 9, due to the feature structure of the first exemplary embodiment where a same number of (viewpoint images) parallax images are generated in the first direction and the second direction within each pixel and the numbers of sub-pixels of different color arrangement and the like are equivalent within each of the viewpoint images, equivalent and significant stereopsis can be achieved in both the first positioning state and the second positioning state. Further, with this structure, the 3D resolution in the first positioning state and the second positioning state can be made equivalent regardless of the number of viewpoints.

Further, the number of the sub-pixel groups within a single pixel is designed to be equivalent to the number of primary colors (4) in the first exemplary embodiment which employs the four primary colors. Thus, the number of viewpoints in both the first positioning state and the second positioning state becomes the multiples of the number of primary colors (4). This makes it possible to suppress generation of color moiré.

When it is expressed generally by defining the number of primary colors as M and the number of viewpoints as N, the structure with which the number N of viewpoints becomes the multiples of M colors within a single pixel. Thus, compared to a case where the M colors emerge over a plurality of pixels for the visual-field angle direction, changes in the hue for the view-field angles can be controlled. Thereby, it is possible to achieve such an effect that color moiré is not generated in the displayed image.

In the first exemplary embodiment, described heretofore by referring to each of the drawings of FIG. 1 to FIG. 9 is the case which employs the fly-eye lens (the fly-eye lens element) as the optical separation module 50. However, as the optical separation module 50, it is possible to employ both a static optical separation module such as the fly-eye lens which constantly separates light rays and an active optical separation module such as a liquid crystal lens which is capable of controlling separation of light rays electrically.

That is, as the static optical separation modules, it is possible to employ a parallax barrier, a pinhole barrier, or the like capable of separating light rays in both the first direction and the second direction. With such a structure, it is also possible to display a stereoscopic image effectively provided that the points described later are taken into consideration. Further, as the active optical separation module, it is also possible to employ a liquid crystal element, a liquid crystal barrier element, or the like capable of performing optical separation in the first direction and the second direction. With such active optical separation modules, the directions towards which the exit light is to be separated can be changed flexibly as necessary. Thus, such optical separation modules can be used to display significant parallax images.

Figure 10:
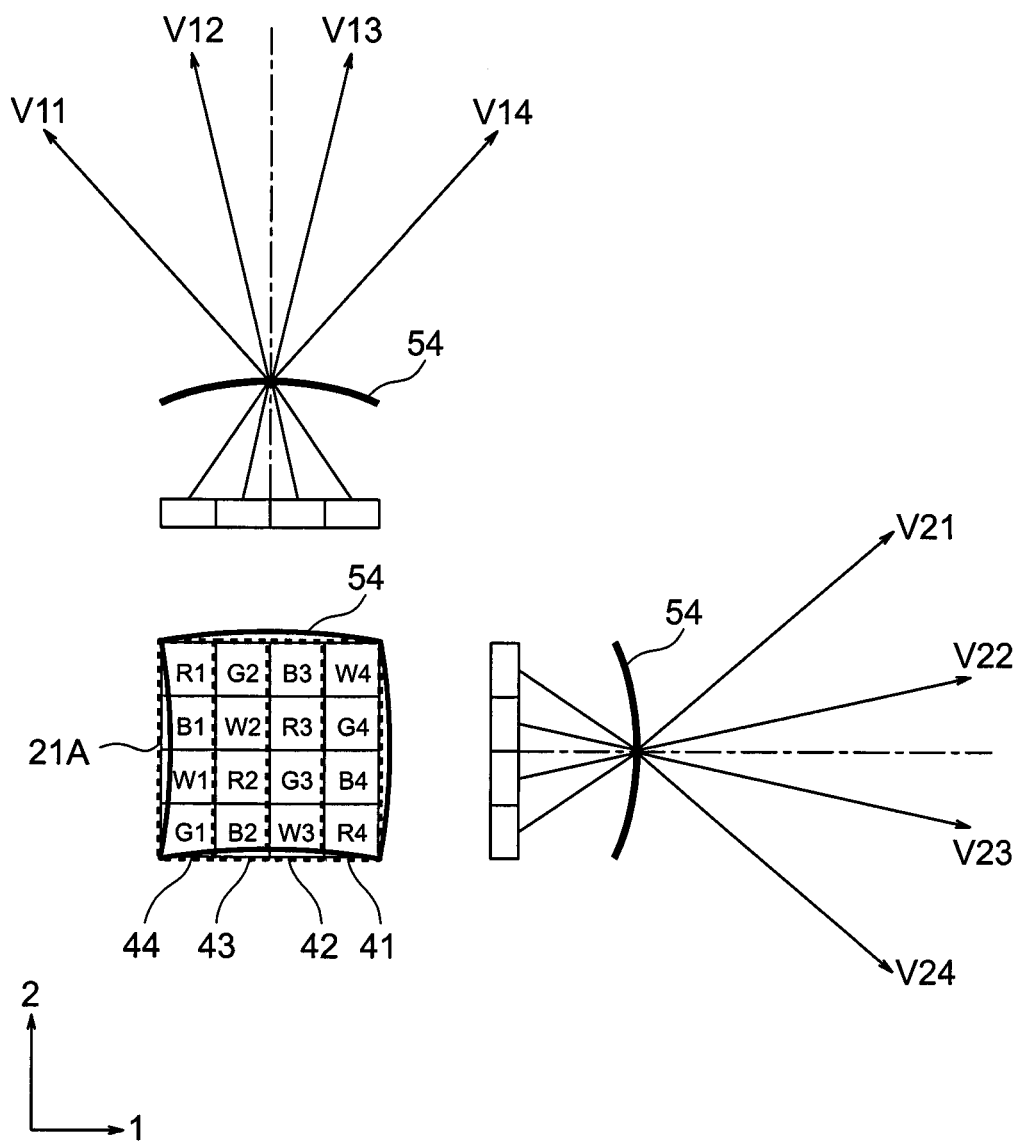
FIG. 10 shows illustrations regarding light-ray separation when a static optical separation module is used as an optical separation module that corresponds to the pixel in the structure of 4×4 sub-pixels disclosed in FIG. 8.

Here, the points to be taken into consideration in terms of the static optical separation modules will be described by referring to FIG. 10. Here, a static optical separation module 54 will be described based on the pixel 21A constituted with the sub-pixels (sub-pixel groups) shown in FIG. 8 for convenience.

In the first positioning state in which the first direction is set as the horizontal direction, the parallax images from the sub-pixel groups 41, 42, 43, and 44 are separated into light rays (distributed) towards the directions of V11, V12, V13, and V14, respectively, via the optical separation module 54. This makes it possible to provide stereopsis.

However, at the same time, the exit light is separated into light rays in the directions of V21, V22, V23, and V24 via the optical separation module 54 also in the second direction that is the orthogonal direction of such case.

That is, the static optical separation module 54 distributes the exit light towards the directions according to both of the first and second directions. Thus, there is a possibility of generating "color breakup" with which a specific color is visually sensed strongly for the orthogonal direction when the separating angle is large. Therefore, such optical separation module may be employed by paying an attention to the point that it is necessary to suppress the separating angle to a prescribed value.

Subsequently, a case of employing the above-described active optical separation module will be described by referring to FIG. 11. Here, described is a case where light-ray separation is performed only in the first direction via an active optical separation module 55 based on the pixel 21A constituted also with the sub-pixels (the sub-pixel groups) shown in FIG. 8 for convenience.

Contrary to the static optical separation module 54 described above, as shown in FIG. 11, the active optical separation module 55 can perform separation of light rays only in the first direction as the light-ray separating direction (distribution of the exit light only in the direction according to the first direction) and does not separate it into light rays for the second direction that is the orthogonal direction. This makes it possible to avoid color breakup regardless of the separating angles.

Similarly, in the second positioning state in which the second direction is set as the horizontal direction, it is possible to perform separation of light rays only in the second direction that is the light-ray separating direction and not to perform separation of light rays in the first direction.

That is, the use of the active optical separation module 55 makes it possible to employ the structure which can distribute the exit light to each of the directions on the plane which includes the first direction and is vertical to the pixel 21A (the display panel 11) under the first positioning state and distribute the exit light to each of the directions on the plane which includes the second direction and is vertical to the pixel 21A (the display panel 11) under the second positioning state.

Figure 11:
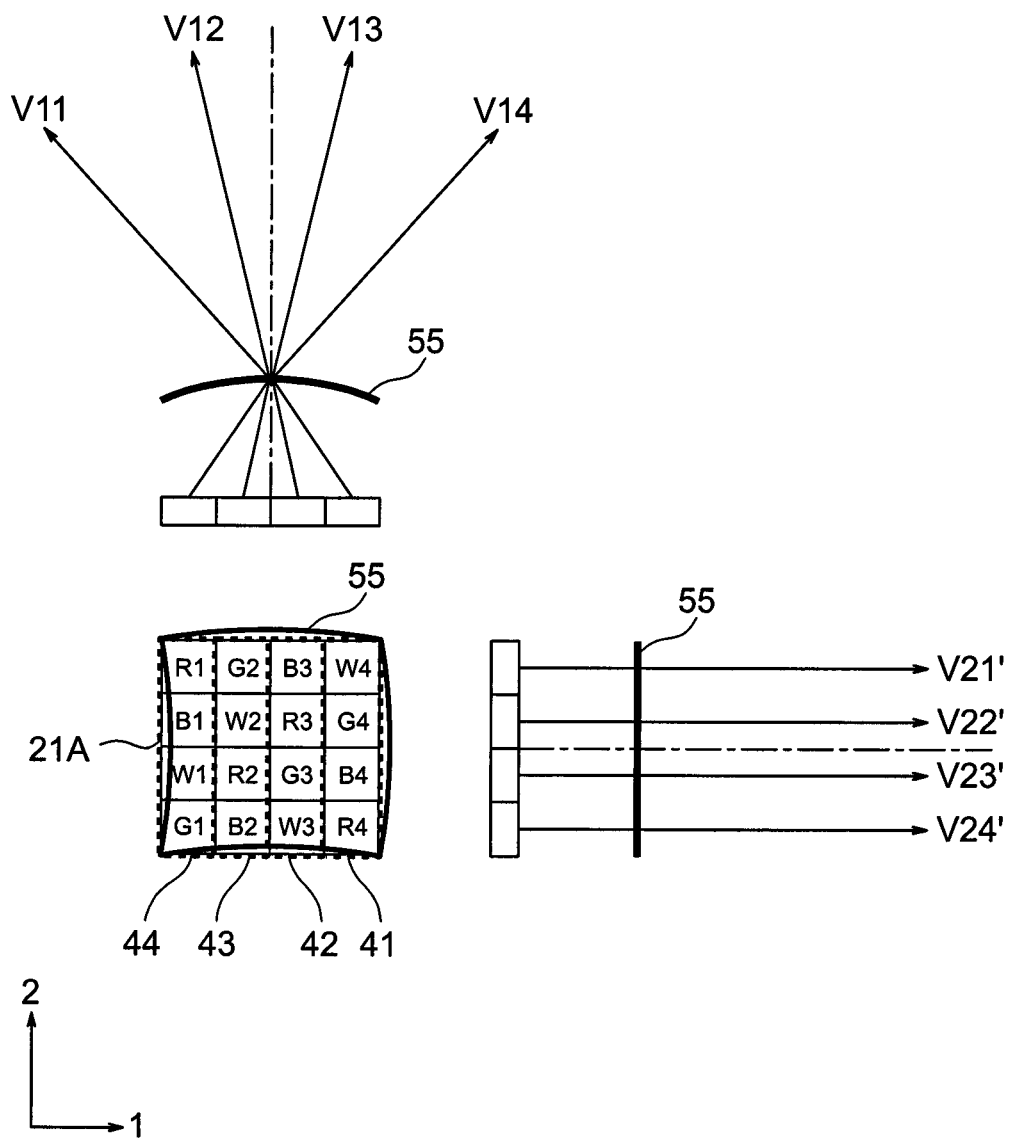
FIG. 11 shows illustrations regarding light-ray separation when the light is separated only in one direction by using an active optical separation module as an optical separation module that corresponds to the pixel in the structure of 4×4 sub-pixels disclosed in FIG. 8.

Referring to FIG. 11, in the first positioning state in which the first direction is set as the horizontal direction, the parallax images from the sub-pixel groups 41, 42, 43, and 44 are separated into light rays in the directions of V11, V12, V13, and V14, respectively, via the active optical separation module 55. Thereby, it is possible to achieve stereopsis. In the meantime, regarding the second direction that is the orthogonal direction of such case, the light travels straight forward towards the directions of V21', V22', V23', and V24' (not separated into light rays).

Similarly, the active optical separation module 55 functions effectively also in the second positioning state. Therefore, it is possible to avoid color breakup regardless of the separating angles in both of the positioning states.

The shape of the sub-pixels described heretofore is not limited to a square shape. It is also possible to use a polygonal shape (including an arc shape) such as a trapezoid shape, a hexagonal shape, or the like as long as the aperture areas between each of the sub-pixels are uniform.

Subsequently, FIG. 12 shows an example of a terminal device 60 to which the stereoscopic image display device 10 according to the first exemplary embodiment described above is mounted. That is, the terminal device 60 is constituted with the stereoscopic image display device 10 and a casing 70 which houses it inside thereof. As the optical separation module, the stereoscopic image display device 10 is provided with a liquid crystal lens element (not shown) which is capable of performing separation of light rays in the directions according to the first direction and the second direction.

Note here that the bidirectional arrows and H applied thereto indicate the horizontal direction viewed from the observer (the horizontal direction that is the direction parallel to the straight line connecting between the left eye and the right eye of the observer).

Figure 12A:
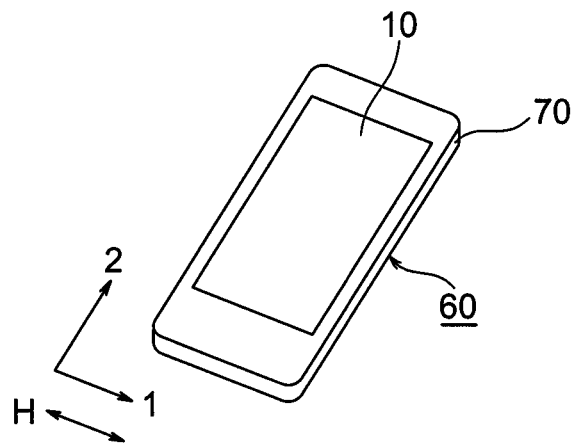
Figure 12B:
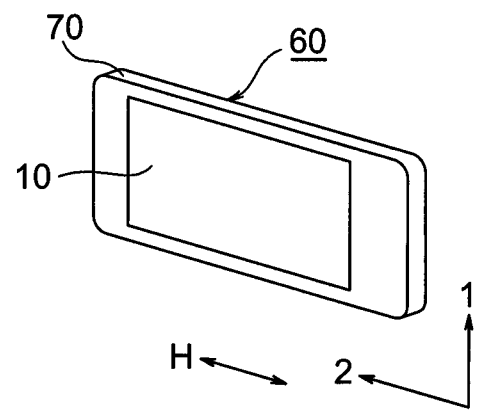
Figure 12C:
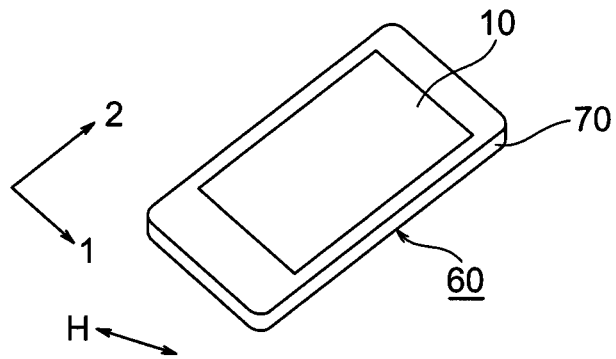

That is, FIG. 12A shows the first positioning state in which the first direction is the horizontal direction H when viewed from the observer, and FIG. 12B shows the second positioning state in which the second direction is the horizontal direction H when viewed from the observer. Further, FIG. 12C shows an example of the positioning state which does not correspond to either of the first and second positioning states.

As described, by employing the stereoscopic image display device 10 according to the first exemplary embodiment, the terminal device 60 can provide the stereoscopic displays of about the same degrees achieved by the high resolution for the two directions (in the two positioning states).

Figure 13:
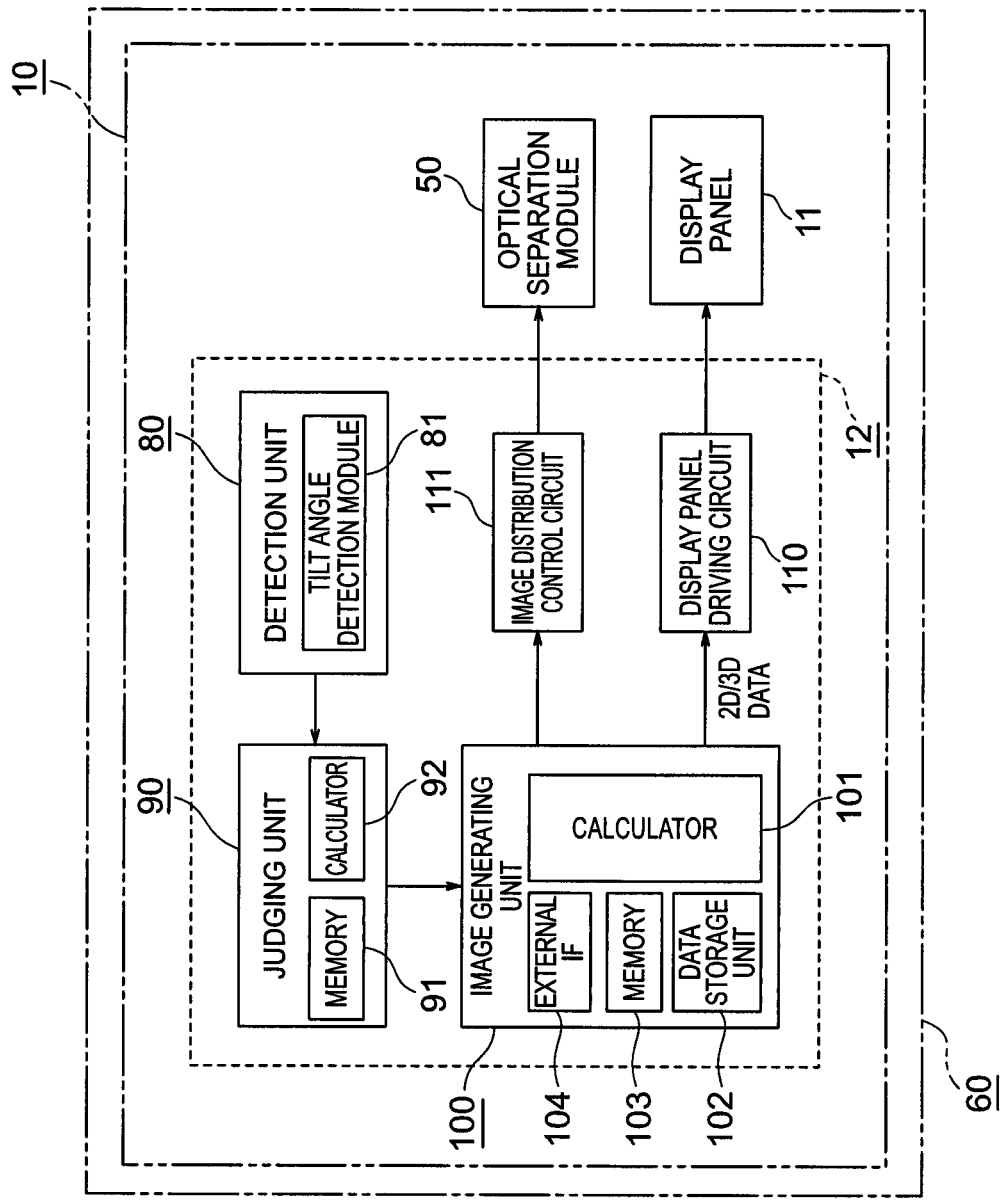
FIG. 13 is a functional block diagram showing the structure of a case where the stereoscopic image display device according to the exemplary embodiment of the present invention includes a display controller.

Next, FIG. 13 shows the functional structures of the stereoscopic image display device 10 that is provided with a display controller 12, which includes a function for driving the display panel 11, a function for controlling the active optical separation module, and a function for detecting the move of the terminal device 60 (the device main body) and for performing judgment and the like regarding stereopsis.

That is, as shown in FIG. 13, the stereoscopic image display device 10 includes the display panel 11, the display controller 12 and the optical separation module 50 having the liquid crystal element (not shown). Further, assumed herein is a state in which the stereoscopic image display device 10 is provided to the terminal device 60 shown in FIG. 12.

The display controller 12 includes: a detection unit 80 which detects displacement generated when the terminal device 60 makes a move; a judging unit 90 which judges whether or not both eyes of the observer are placed (located) within the stereopsis region; an image generating unit 100 which has a function that generates image data transmitted to the display panel 11; a display panel driving circuit (a display panel driving unit) 110 which has a function that generates signals (synchronous signals and the like) required for driving the display panel 11; and an image distribution control circuit (an image distribution control unit) 111 which includes a function that generates signals for driving the liquid crystal element.

The detection unit 80 is constituted with a sensor that detects a displacement generated when the terminal device 60 makes a move. Note here that the displacement of the terminal device 60 detected by the detection unit 80 is a change in the tilt angle and a shift amount. For example, in a case where a sensor such as an accelerator sensor, a geomagnetic sensor, or the like is used as the detection unit 80, the change in the tilt angle and the shift amount can be calculated on the basis of the gravitational acceleration or the geomagnetism. That is, the detection unit 80 includes a tilt angle detecting module 81 which detects the change in the tilt angle and the shift amount, and it is constituted to detect the positional relation between the stereoscopic image display device 10 and the observer.

Further, the detection unit 80 employs a structure with which information (displacement information) regarding the tilt angle as a result of detection done by the tilt angle detecting module 81 is transmitted to the judging unit 90.

The judging unit 90 includes: a memory 91 which stores the displacement information acquired from the detection unit 80, information regarding the stereoscopic region of the display panel 11, and the like; and a calculator 92 which judges whether or not both eyes of the observer are within the stereopsis region based on the information acquired from the detection unit 80 as necessary and the information stored in the memory 91.

Note here that the information stored in the memory 91 (the information regarding the stereopsis region of the display panel 11) includes judgment reference information that is set in advance by using parameters such as the separating angles of the stereoscopic image display device 10, and the calculator 92 is structured to use the judgment reference information when judging whether or not both eyes of the observer are within the stereopsis region.

For example, when the terminal device 60 is in the first positioning state shown in FIG. 12A or in the second positioning state shown in FIG. 12B, the judging unit 90 is structured to judge that both eyes of the observer are within the stereopsis region.

In the meantime, the judging unit 90 is structured to judge that both eyes of the observer are outside of the stereopsis region, when the terminal device 60 is not in the first positioning state or the second positioning state but in the state shown in FIG. 12C, for example.

Further, the judging unit 90 employs a structure with which signals (visual field judgment signals) based on the result of the judgment to the image generating unit 100. Among the visual field judgment signals, the signal based on the judgment that both eyes of the observer are within the stereopsis region contains the information (judgment information) of the judgment of the judging unit 90 regarding whether it is in the first positioning state or the second positioning state.

That is, the judging unit 90 has a function that judges whether it is in the first positioning state in which the horizontal direction that is the direction parallel to the straight line connecting between the left eye and the right eye of the observer and the first direction are substantially parallel to each other or in the second positioning state in which the horizontal direction and the second direction are substantially parallel to each other based on the displacement information acquired from the detection unit 80.

The image generating unit 100 is constituted with: a calculator 101 which executes image processing; a data accumulation unit 102 which stores display target data to be displayed on the display panel 11; a memory 103 which stores an operation control program and the like of the calculator 101; and an external IF (interface) 104 which intermediates exchange of the information with the outside.

Each of those structural members functions effectively, so that the image generating unit 100 can generate image data with parallax (3D data) or image data without parallax (2D data) effectively according to the signals received from the judging unit 90.

The image generating unit 100 is structured to generate the image data by reading out the display target data stored in the data accumulation unit 102 by using the calculator 101 and applying image processing thereon. In a case where the display target data is three-dimensional data containing depth information, a preferable method is employed with which the calculator 101 performs rendering processing on the three-dimensional data to generate two-dimensional image data.

As the two-dimensional image data, the calculator 101 when generating the 3D data used for stereoscopic display employs a structure with which virtual camera of a prescribed number of viewpoints are set for the three-dimensional data and rendering processing is performed for each of those. That is, the two-dimensional image data for each of the viewpoints having parallax (3D data) as shown in FIG. 7 is generated in such a manner that the calculator 101 sets the virtual camera of a prescribed number of viewpoints (four viewpoints in this case) for the three-dimensional data and performs rendering processing for each of those.

In the meantime, the calculator 101 when generating the 2D data used for flat display, i.e., the two-dimensional data without parallax, employs a structure with which a virtual camera of a single viewpoint is set for the three-dimensional data and rendering processing is performed.

As described above, for generation of the image data executed by the image generating unit 100, it is preferable to employ the method for generating the data from the three-dimensional data containing the depth information. However, it is also possible to employ the structure with which the display target data on which rendering processing is performed in advance is stored in the data accumulation unit 102 and it is read out selectively.

That is, it is possible to employ the method with which: the display target data in a form of two-dimensional image data corresponding to FIG. 7 is stored in the data accumulation unit 102 in advance; and the calculator 101 selects and reads out the image data corresponding to stereoscopic display or flat display from the display target data based on the visual field judgment signals received from the judging unit 90. When such a method is employed, the rendering processing becomes unnecessary. Thus, it is possible to employ the calculator 101 whose processing capacity and calculation speed are lower than those of the calculator used for the generating method that requires the rendering processing. Thereby, the image generating unit 100 can be of low cost.

Further, the image generating unit 100 is structured to generate the 3D data or the 2D data according to the visual field judgment signals received from the judging unit 90 and to output the data to the display panel driving circuit 110. As described by referring to FIG. 8 and FIG. 9, the sub-pixels corresponding to each viewpoint change depending on whether the terminal device 60 is in the first positioning state or the second positioning state. Thus, the image generating unit 100 when outputting the 3D data outputs the image data corresponding to each state to the display panel driving circuit 110. This makes it possible to display the parallax images corresponding to the positioning state of the terminal device 60 on the display panel 11 via the display panel driving circuit 110.

Further, simultaneously with the output of the data to the display panel driving circuit 110, the image generating unit 100 has a function that transmits a command signal according to the positioning state of the terminal device 60 to the image distribution control circuit 111.

That is, the image generating unit 100 transmits, to the image distribution control circuit 111, a command signal for enabling the optical separation module (the liquid crystal lens) 50 only for the first direction (only the direction corresponding to the first direction) when the terminal device 60 is in the first positioning state shown in FIG. 12A, a command signal for enabling the optical separation module 50 only for the second direction (only the direction corresponding to the second direction) when the terminal device 60 is in the second positioning state shown in FIG. 12B, and a command signal for displaying a flat display by disabling the optical separation module 50 when the terminal device 60 is outside of the stereopsis region as shown in FIG. 12C.

The liquid crystal lens (the liquid crystal lens element) is employed as the optical separation module 50 herein. However, other than that, it is also possible to employ an active element such as a liquid crystal barrier element that can be controlled with electric signals.

Further, as the optical separation module 50, it is also possible to use a static element which cannot be controlled by electric signals, such as a fly-eye lens, a parallax barrier, a pinhole, or the like. With that, it becomes unnecessary to provide the image distribution control circuit 11 to the display controller 12. Such simplification of the structure makes it possible to decrease cost and the like.

Further, for the sake of the explanations, FIG. 13 shows the structure where the corresponding calculator 92 and the corresponding calculator 101 individually exist in the judging unit 90 and the image generating unit 100, and the explanations are provided based thereupon. However, instead of those, a single calculator having the functions of both of the above-described calculator 92 and the calculator 101 may be employed to the display controller 12.

Further, a processing function of either the calculator 92 or the calculator 101 or the functions of both may be provided inside the calculator or another processor which processes other functions (e.g., communication control) of the portable display device (the terminal device 60) to which the stereoscopic image display device 10 is applied.

(Explanations of Actions)

Next, actions of the stereoscopic image display device 10 shown in FIG. 13 will be described by referring to a flowchart shown in FIG. 14. The explanations of the actions provided herein are common to all the pixels (the pixel matrixes), the optical separation modules 50, and the like shown in FIG. 2 to FIG. 6 and FIG. 8 to FIG. 11.

Figure 14:
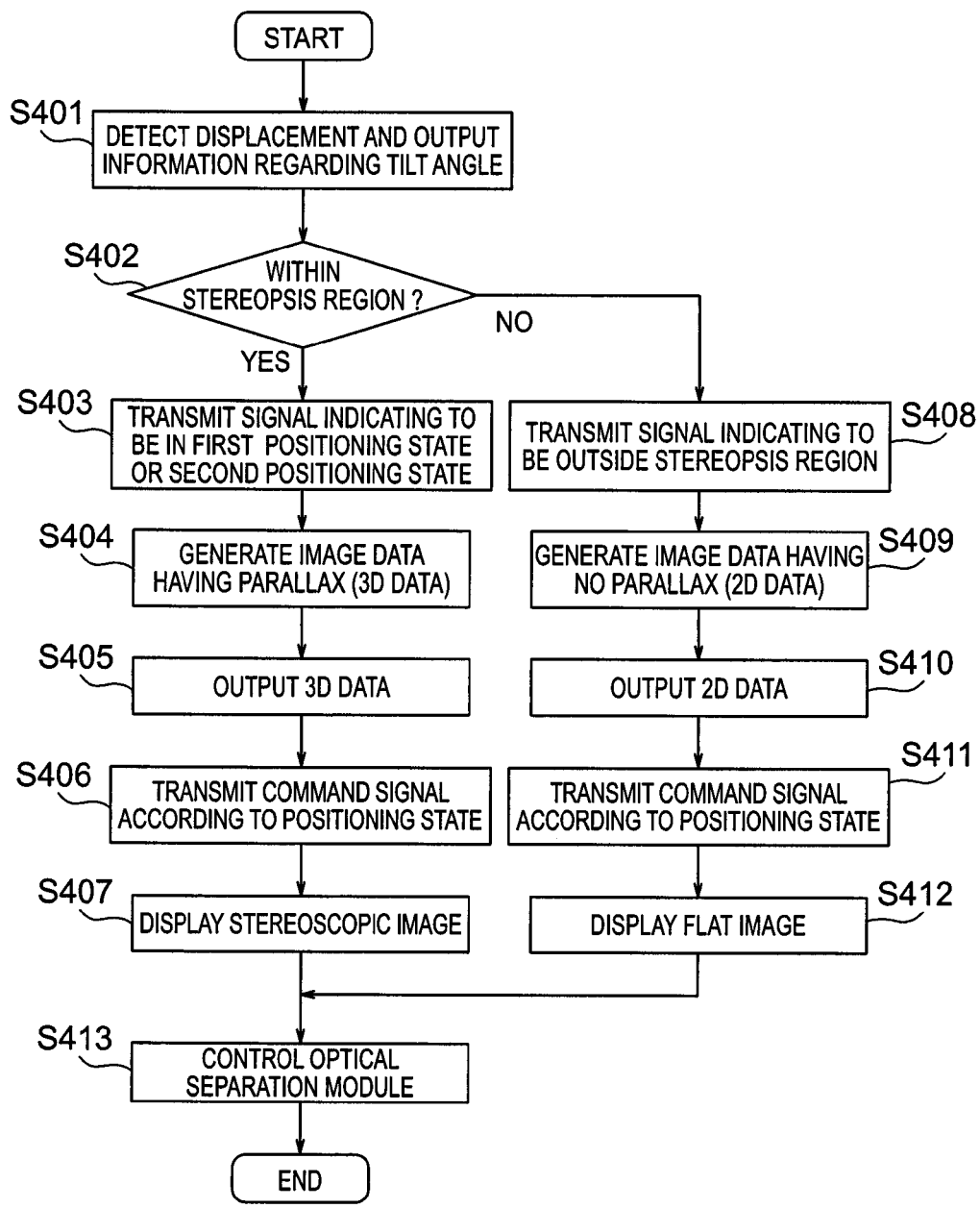
FIG. 14 is a flowchart showing actions of the stereoscopic image display device disclosed in FIG. 13.

First, the detection unit 80 detects displacement of the terminal device 60 and transmits the displacement information to the judging unit 90 (FIG. 14: S401).

Then, the calculator 92 of the judging unit 90 judges whether or not both eyes of the observer are within the stereopsis region based on the displacement information received from the detection unit 80 and the information stored in the memory 91 (FIG. 14: S402).

(Display of a Stereoscopic Image)

Here, the judging unit 90 upon judging that both eyes of the observer are within the stereopsis region (FIG. 14: S402/Yes) transmits a signal to the image generating unit 100 indicating that both eyes are within the stereopsis region (FIG. 14: S403). As described above, the signal indicting to be within the stereopsis region as the visual field judgment signal contains judgment information regarding whether or not the device is within the first positioning state or the second positioning state.

Subsequently, the image generating unit 100 upon receiving the signal indicating to be within the stereopsis region from the judging unit 90 reads out the display target data stored in the data accumulation unit 102 by the calculator 101 and performs rendering processing thereon to generate image data (3D data) having parallax (FIG. 14: S404).

Then, the image generating unit 100 outputs the generated 3D data to the display panel driving circuit 110 (FIG. 14: S405).

In addition, the image generating unit 100 transmits a command signal according to the positioning state of the terminal device 60 to the image distribution control circuit 111 (FIG. 14: S406).

That is, when the terminal device 60 is in the first positioning state, the image generating unit 100 transmits a command signal indicating to enable the optical separation module (the liquid crystal lens) 50 only for the first direction to the image distribution control circuit 111 (FIG. 14: S406). In the meantime, when the terminal device 60 is in the second positioning state, the image generating unit 100 transmits a command signal indicating to enable the optical separation module (the liquid crystal lens) only for the second direction (FIG. 14: S406) to the image distribution control circuit 111.

The display panel driving circuit 110 generates signals required for driving the display panel 11 (a synchronous signal and the like) to drive the display panel 11 thereby to display a parallax image based on the 3D data inputted from the image generating unit 100 on the display panel 11 (FIG. 14: S407).

(Display of a Flat Image)

In the meantime, the judging unit 90, upon judging that both eyes of the observer are outside of the stereopsis region (FIG. 14: S402/No), transmits a signal indicating that both eyes are outside of the stereopsis region to the image generating unit 100 (FIG. 14: S408).

The image generating unit 100, upon receiving the signal indicating to be outside of the stereopsis region from the judging unit 90, reads out the display target data stored in the data accumulation unit 102 by the calculator 101 and performs rendering processing thereon to generate image data having no parallax (2D data) (FIG. 14: S409).

Then, the image generating unit 100 outputs the generated 2D data to the display panel driving circuit 110 (FIG. 14: S410).

Further, the terminal device 60 in this case is in the positioning state outside of the stereopsis region as shown in FIG. 12C. Thus, the image generating unit 100 transmits a command signal which indicates to provide a flat display by disabling the optical separation module (the liquid crystal lens) 50 to the image distribution control circuit 111 (FIG. 14: S411).

The display panel driving circuit 110 generates the signals (a synchronous signal and the like) required for driving the display panel 11 to drive the display panel 11 thereby to display the images based on the 2D data inputted from the image generating unit 100 on the display panel 11 (FIG. 14: S412).

(Control of the Optical Separation Module)

Simultaneously with the display of the image by the display panel driving circuit 110 110 (FIG. 14: S407 or S412), the image distribution control circuit 111 generates a signal for driving the liquid crystal lens element constituting the optical separation module 50 based on the command signal acquired from the image generating unit 100 and controls the optical separation module 50 based thereupon to execute significant processing on the image displayed on the display panel 11 (FIG. 14: S413).

That is, in a case where the command signal indicating to enable the optical separation module 50 only for the first direction is received from the image generating unit 100 (FIG. 14: S406), the image distribution control circuit 111 controls the optical separation module 50 to separate the exit light only for the first direction (FIG. 14: S413). Further, in a case where the command signal indicating to enable the optical separation module 50 only for the second direction is received from the image generating unit 100 (FIG. 14: S406), the image distribution control circuit 111 controls the optical separation module 50 to separate the exit light only for the second direction (FIG. 14: S413).

Furthermore, in a case where the command signal indicating to provide flat display is received from the image generating unit 100 (FIG. 14: S411), the image distribution control circuit 111 controls (disables) the optical separation module 50 not to separate the exit light for any of the directions (FIG. 14: S413).

The explanations of the actions are provided according to the order of numbers applied in FIG. 14 (S401 to S413) for convenience. However, the content of the actions of the stereoscopic image display device 10 according to the first exemplary embodiment is not limited only to such order.

Further, it is also possible to employ a structure with which each execution contents of each of the procedures of the above-described steps S401 to S413 (FIG. 14) are put into programs and a series of each of the control programs is achieved by a computer.

(Effects and the Like of the First Exemplary Embodiment)

The display panel 11 according to the first exemplary embodiment employs the structure with which pixels each constituted with sub-pixels of N×N pieces colored in M primary colors are arranged as a matrix. Particularly, in that structure, neighboring sub-pixels in each pixel are of different colors from each other, the array pitches of the sub-pixels are uniform for the first and the second directions, and the existence probability of the sub-pixels of different colors is the same for the first and the second directions (the same number of parallax images are generated in the first direction and the second direction within each pixel, and the numbers of sub-pixels of different colors are equivalent within the parallax image). Thereby, color moiré generated in the display image can be suppressed when the exit light is distributed by the optical separation module 50 for providing display. At the same time, a stereoscopic image of high resolution can be displayed in the two different positioning states.

That is, in general, when the number of primary colors is defined as M (natural number of 1 or larger) and the number of viewpoints is defined as N (natural number of 2 or larger), the number N of the viewpoints becomes a multiple of the number M of the primary colors (N mod M=0). Due to such structure and the like, it is possible to provide a stereoscopic image display device capable of suppressing generation of color moiré and to display image of high resolution in the two different positioning states.

As an exemplary advantage according to the invention, the present invention is capable of providing a stereoscopic image display device, a stereoscopic image display method, and a program capable of displaying significant stereoscopic images regardless of the positioning state of the device in particular.

Second Exemplary Embodiment

A second exemplary embodiment of an image display device according to the present invention will be described by referring to FIG. 15 and FIG. 16. Note here that same reference numerals are used for the structural elements equivalent to those of the first exemplary embodiment described above.
(Overall Structure)

Each pixel according to the second exemplary embodiment shown in FIG. 15 is constituted with three primary colors as in the case of the pixel 20A shown in FIG. 2B. A pixel matrix 23 is constituted with such pixels.

Similarly, the pixel shown in FIG. 16 is constituted with four primary colors as in the case of the pixel 21A shown in FIG. 4B. A pixel matrix 24 is constituted with such pixels.

Compared to the case of the first exemplary embodiment shown in FIG. 2B and FIG. 4B, the pixel matrixes (23 and 24) according to the second exemplary embodiment exhibit such a characteristic that the pixels having the sub-pixels in different color layout are arranged for both the first and second directions that are the optical separating directions of the lens array 50. In the second exemplary embodiment, the structures and actions of a case where the number M of primary colors is 2 or larger will be described.

Figure 15A:
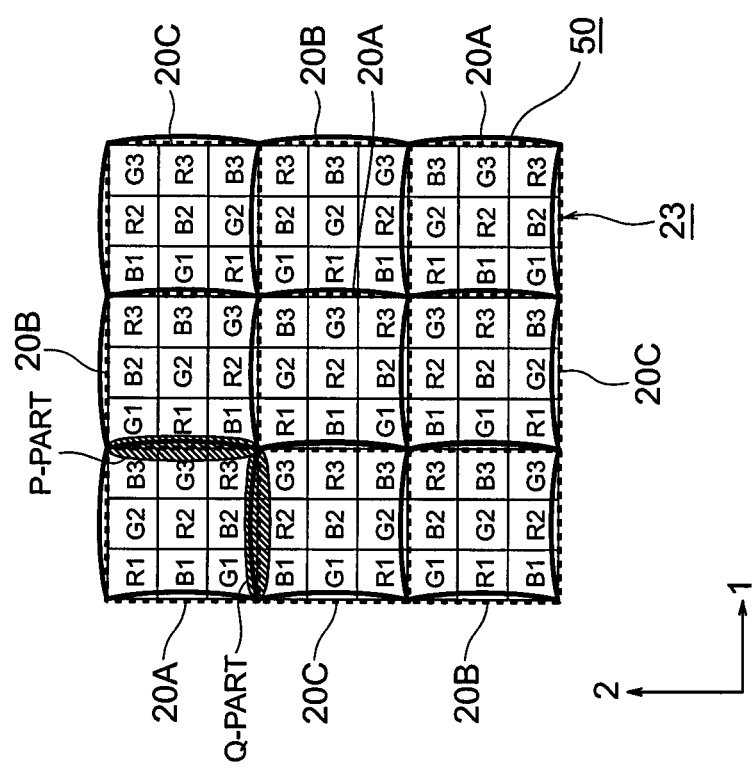

As shown in FIG. 15A, all of the pixels 20A, 20B, and 20C are in the structure of 3×3 sub-pixels constituted with the three primary colors and the color layout thereof is different from each other. Further, the pixel matrix 23 is so structured that the pixels 20A, 20B, and 20C are not placed neighboring to each other in both the first and second directions.

Figure 15B:
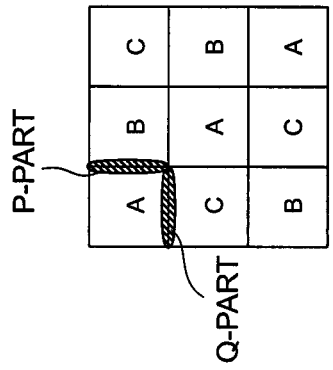

That is, when the color layout of the pixel 20A is defined as A, the color layout of the pixel 20B is defined as B, and the color layout of the pixel 20C is defined as C, the pixels are arranged in such a manner that the pixels of the same color layout are not placed neighboring to each other in the first direction and the second direction (the neighboring pixels are necessarily in different color layout from each other) as shown in FIG. 15B.

Further, the sub-pixels located at the boundaries between each of the pixels (e.g., P-part between A and B, Q-part between A and C) are so arranged that the same-color sub-pixels are not continuously arranged for the first direction and the second direction further. This is shown in FIG. 15A, and differences and the like in the colors between the neighboring sub-pixels such as the sub-pixels between B3 and G1, G3 and R1, R3 and B1 at the P-part and between G1 and B1, B2 and R2, R3 and G3 at the Q-part are the features of such layout.

Next, as shown in FIG. 16A, all of the pixels 21A, 21B, 21C, and 21D are in the structure of 4×4 sub-pixels constituted with the four primary colors. Further, the pixel matrix 24 is so structured that the pixels 21A, 21B, 21C, and 21D of different color layout are not placed neighboring to each other in both the first and second directions.

That is, when the color layout of the pixel 21A is defined as A, the color layout of the pixel 21B is defined as B, the color layout of the pixel 21C is defined as C, and the color layout of the pixel 21D is defined as D, the pixels are arranged in such a manner that the pixels of the same color layout are not placed neighboring to each other in the first direction and the second direction (the neighboring pixels are necessarily in different color layout from each other) as shown in FIG. 16B. Further, the sub-pixels located at the boundaries between each of the pixels are arranged in such a manner that the same color is not continuously placed for the first direction and the second direction as in the content of the explanations provided by referring to FIG. 15.

In FIG. 15 or FIG. 16, the cycles of the color layout (the cycle of the pixel layout) for the first direction and the second direction are defined as 3 or 4 which is the number of the primary colors of respective case. Note here that the cycle of the color layout is equivalent to the cycle from the pixel to the pixel of the same color layout. That is, employed is a structure in which the pixels constituted with the sub-pixels of different color layout in the number (M) of the primary colors are combined and arranged cyclically in each of the first and second directions (a structure in which the pixels are combined and arranged at the cycle of the number (M) of the primary colors).

However, the cycle of the color layout is not limited only to that. Various kinds of color layout cycles can be employed as appropriate. That is, referring to the cycle in the first direction in FIG. 15, for example, it is repeated in order of "A→B→C→A→ - - - ". However, the stereoscopic image display device 10 may be structured by applying various kinds of cycles by setting the cycle in order of "A→A→B→B→C→C→A→A - - - ", for example. Note, however, that there may be an issue of nonuniformity generated in the layout number of each color due to the number of pixels on the display panel (value of the residue regarding the number of pixels and the cycle) as the cycle of the color layout is set to be longer. Therefore, in the second exemplary embodiment, each of the sub-pixels and each of the pixels are structured in such a manner that the cycle of the color layout becomes the same as the number of the primary colors so as to improve the uniformity in the layout of each color.

Further, as in the case of the first exemplary embodiment, each pixel according to the second exemplary embodiment is so structured that the neighboring sub-pixels for the two optical separating directions are not of the same color. Furthermore, in each pixel, the existence probability of the same-color sub-pixels for the two optical separating directions is designed to be the same between each of the M primary colors. Further, the array pitches of the sub-pixels for the two optical separating directions are set to be equivalent.

(Effects and the Like of the Second Exemplary Embodiment)

The second exemplary embodiment is designed to be in a longer distance order compared to the case of the first exemplary embodiment due to the regularity of the pixel color layout described above, so that it is possible to display images constituted with more natural coloration. Further, other structures and actions thereof are the same as those of the first exemplary embodiment, and other operational effects generated thereby are also the same.

Third Exemplary Embodiment

A third exemplary embodiment of an image display device according to the present invention will be described by referring to FIG. 17 and FIG. 18. Note here that same reference numerals are used for the structural elements equivalent to those of the first exemplary embodiment.
(Overall Structure)

Figure 17:
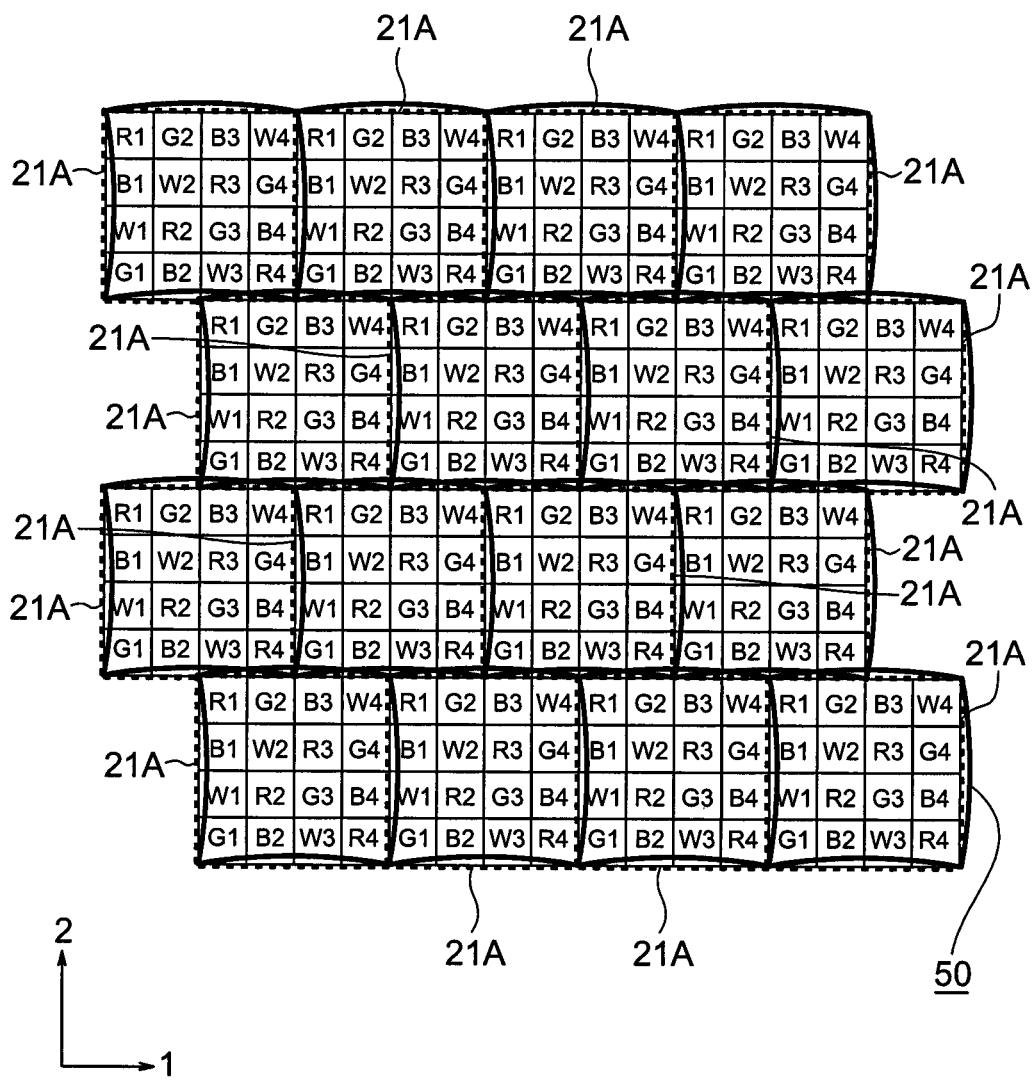
FIG. 17 is a diagram showing a state where pixels having a structure of 4×4 sub-pixels and lens array elements according to a stereoscopic image display device according to a third exemplary embodiment of the present invention are arranged in a delta form.
Figure 18:
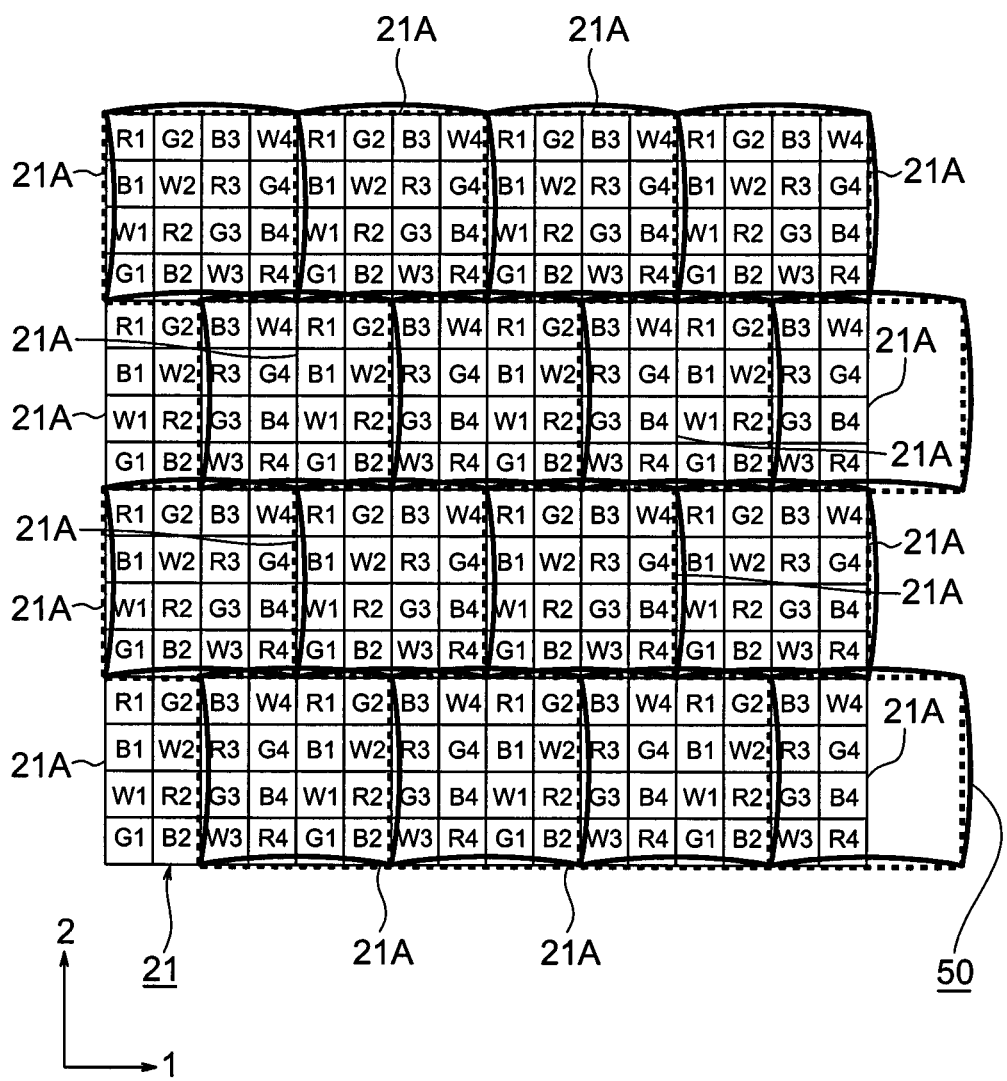
FIG. 18 is a diagram showing a pixel matrix constituted with the structure of 4×4 sub-pixels and the corresponding lens array elements arranged in a delta form according to the stereoscopic image display device according to the third exemplary embodiment.

In both of FIG. 17 and FIG. 18, a structure is employed with which the fly-eye lens element constituting the lens array 50 is in a delta form, i.e., the triangle formed by connecting the centers of the fly-eye lens elements forms an isosceles triangle. More specifically, a structure is employed with which each of the optical elements are arranged in such a manner that the shape acquired by connecting the centers of the three fly-eye lens elements neighboring to each other forms an isosceles triangle that is laterally symmetric with respect to the second direction.

Note here that FIG. 17 shows a structure in which the pixels 21A each being in a structure of 4×4 sub-pixels constituted with the four primary colors is in a delta form, i.e., arranged in such a manner that the triangle formed by connecting the centers of each of the pixels 21A forms an isosceles triangle, and each of the pixels 21A corresponds to each of the opposing fly-eye lens elements.

In the meantime, in FIG. 18, a pixel matrix 21 is employed in the same layout of the pixel 21A shown in FIG. 4B, and the fly-eye lens element arranged in a delta form is opposed thereto.

(Effects and the Like of the Third Exemplary Embodiment)

The third exemplary embodiment employs the structure (FIG. 17) in which the pixels 21A and the fly-eye lens elements corresponding thereto are both arranged in a delta form and the structure (FIG. 18) in which the color layout of the pixels is the same as that of the first exemplary embodiment, only the fly-eye lens elements are arranged in a delta form, and such fly-eye lens elements are opposed to the pixels 21A arranged as a matrix. In particular, by employing the structure shown in FIG. 18 among those, the regularity of the color layout can become of the longer distance order as in the case of the second exemplary embodiment described above. Therefore, it is possible to display image constituted with more natural coloration. Other structures and actions thereof are the same as those of the first exemplary embodiment, and other operational effects generated thereby are also the same.

Further, while the third exemplary embodiment employs the structure in which the pixels constituted with the sub-pixels of the same color layout are arranged on the display panel, it is also possible to employ the structure in which the pixels constituted with the sub-pixels of different color layout patterns are combined as shown in FIG. 16.

Furthermore, as the delta form of each optical element and each pixel, employed here is the structure in which each of the optical elements and each of the pixels are arranged in such a manner that the shape acquired by connecting the centers of the three optical elements neighboring to each other forms an isosceles triangle that is laterally symmetric with respect to the second direction. However, it is also possible to employ a structure in which each of the optical elements and each of the pixels are arranged in such a manner that the triangle becomes an isosceles triangle that is laterally symmetric with respect to the first direction.

Fourth Exemplary Embodiment

A fourth exemplary embodiment of an image display device according to the present invention will be described by referring to FIG. 19 to FIG. 24. Note here that same reference numerals are used for the structural elements equivalent to those of the first exemplary embodiment described above.

(Overall Structure)

Figure 19B:
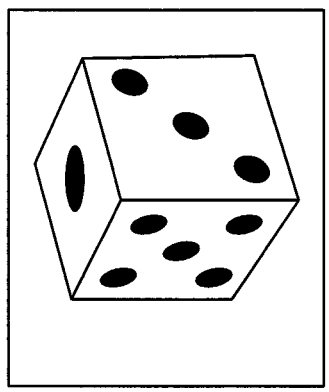
Figure 19D:
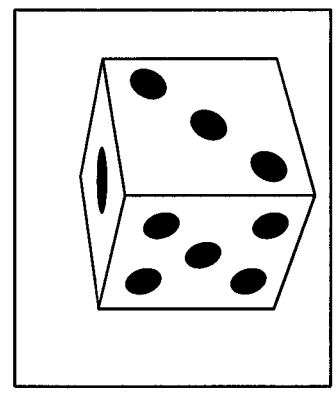
Figure 19A:
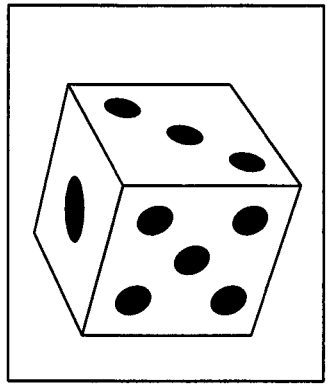

Subsequently, the image shown in FIGS. 19A-19D are examples of image information inputted to each sub-pixel by having the structure of 4×4 sub-pixels constituted with the four primary colors shown in FIG. 4A as the base. FIG. 19A corresponds to a first viewpoint image, FIG. 19B corresponds to a second viewpoint image, FIG. 19C corresponds to a third viewpoint image, and FIG. 19D corresponds to a fourth viewpoint image.

Figure 19C:
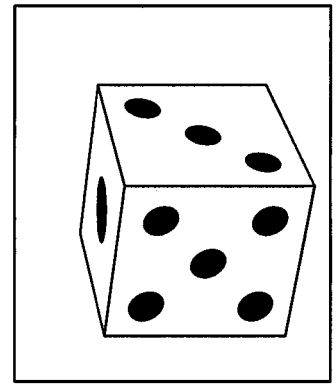

In addition to the difference between the size of the face of "5" and the size of the face of "3" of a dice shown in FIG. 7, there is also a difference in the size of the face of "1" between FIG. 19A and FIG. 19B and in the size of the face of "1" between FIG. 19C and FIG. 19D. In general, the difference between FIG. 19A and FIG. 19B is called horizontal parallax, and the difference between the FIG. 19C and FIG. 19D is called vertical parallax. The first exemplary embodiment shows the display of the horizontal parallax, while the fourth exemplary embodiment shows the display of the horizontal and vertical parallax. This allows the observer to visually recognize significant stereoscopic images.

Next, the relation between the input image and the sub-pixels as well as the structures thereof in the first positioning state where the first direction is set as the horizontal direction will be described by referring to FIG. 20A. Note here that the lens array element 52 corresponding to the pixel 21A is in the same structure as those shown in FIG. 4 and FIG. 8.

Further, the layout of the sub-pixels in this case is the same as that of the pixel 21A shown in FIG. 8. However, the fourth exemplary embodiment has such a feature that the pixel 21A is functioned as a structure constituted with a sub-pixel group 41' in which sub-pixels W4, B3, G4, and R3 are arranged, a sub-pixel group 42' in which sub-pixels G2, R1, W2, and B1 are arranged, a sub-pixel group 43' in which sub-pixels B4, G3, R4, and W3 are arranged, and a sub-pixel group 44' in which sub-pixels R2, W1, B2, and G1 are arranged.

Figure 20A:
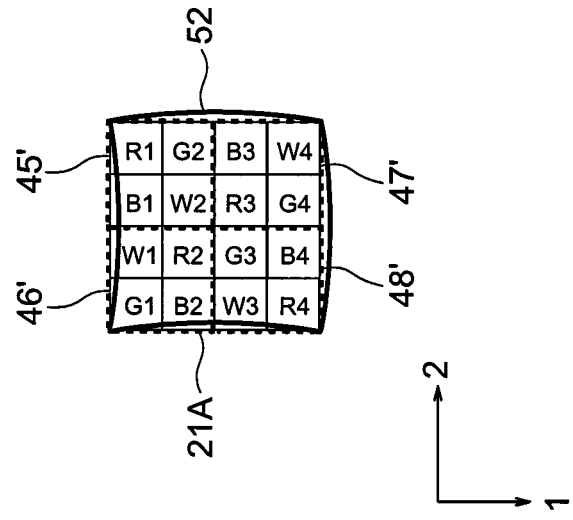

That is, it is so structured that signals corresponding to the first viewpoint image, the second viewpoint image, the third viewpoint image, and the fourth viewpoint image are inputted to the respective sub-pixel groups 41', 42', 43', and 44' shown in FIG. 20A for the input images shown in FIG. 19. With this, it is possible to display image with two horizontal parallaxes and two vertical parallaxes, i.e., four parallaxes in total. At that time, all of the sub-pixel groups 41' to 44' are constituted with the four primary colors, so that it is possible to acquire such an effect that there is no difference generated in the number of displayed colors among each of the viewpoint images within a pixel.

Figure 20B:
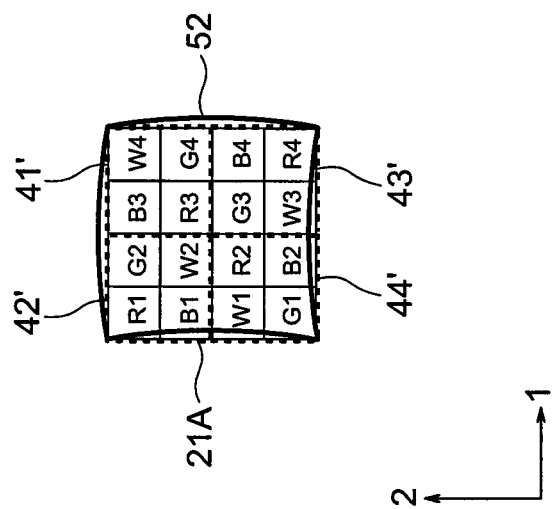

FIG. 20B shows the relation between each of the viewpoint images and the sub-pixels in the second positioning state where the second direction is set as the horizontal direction which is a state rotated clockwise by 90 degrees from the first positioning state shown in FIG. 20A. The pixel 21 in this case rotates according to the rotation of the display panel 11 (the stereoscopic image display device 10), so that the pixel 21A in this case is functioned as the structure constituted with a sub-pixel group 45' in which sub-pixels R1, B1, G2, and W2 are arranged, a sub-pixel group 46' in which sub-pixels W1, G1, R2, and B2 are arranged, a sub-pixel group 47' in which sub-pixels B3, R3, W4, and G4 are arranged, and a sub-pixel group 48' in which sub-pixels G3, W3, B4, and R4 are arranged.

That is, as in the case of the first positioning state, it is so structured that signals corresponding to the first viewpoint image, the second viewpoint image, the third viewpoint image, and the fourth viewpoint image are inputted to the respective sub-pixel groups 45', 46', 47', and 48' shown in FIG. 20B for the input images shown in FIG. 19. At that time, all of the sub-pixel groups 45' to 48' are constituted with the four primary colors, so that it is possible to acquire such an effect that there is no difference generated in the number of displayed colors among each of the viewpoint images within a pixel.

With this structure exhibiting the feature in the sub-pixel groups, the degrees of 3D resolution in the first positioning state and the second positioning state can be made the same regardless of the number of viewpoints. That is, the number of the viewpoints in the first positioning state and the second positioning state becomes the same due to the regularity of the sub-pixel groups within a single pixel, so that same stereopsis can be effectively achieved in each of the positioning state.

In FIG. 21, by taking the structure of 8×8 sub-pixels constituted with the four primary colors shown in FIG. 5 as the base, FIG. 21A shows a structure constituted with sub-pixel groups 411, 412, 413, 414, 421, 422, 423, 424, 431, 432, 433, 434, 441, 442, 443, and 444 for the first positioning state as in the case of the structure of the 4×4 sub-pixels described above (FIG. 20), and FIG. 21B shows a structure constituted with sub-pixel groups 415, 416, 417, 418, 425, 426, 427, 428, 435, 436, 437, 438, 445, 446, 447, and 448 for the second positioning state, respectively.

That is, with the structure of the 8×8 sub-pixels according to the fourth exemplary embodiment, signals corresponding to the images of sixteen viewpoints as a total of four viewpoints in the first direction×four viewpoints in the second direction are inputted for both of the positioning states. At that time, all of the sub-pixel groups 411 to 448 are constituted with the four primary colors, so that it is possible to acquire such an effect that there is no difference generated in the number of displayed colors among each of the viewpoint images within a pixel.

Further, the lens array element 53 is arranged at the position corresponding to the pixel 21A', so that the exit light can be distributed in the directions of the four viewpoints in both the first and second directions.

FIG. 22A shows a structure constituted with sub-pixel groups 41", 42", 43", and 44" for the first positioning state by taking the structure of 6×6 sub-pixels constituted with the three primary colors shown in FIG. 3A as the base, and FIG. 22B shows a structure constituted with sub-pixel groups 411', 412', 413', 421', 422', 423', 431', 432', and 433' for the first positioning state by taking the structure of 9×9 sub-pixels constituted with the three primary colors shown in FIG. 3B as the base.

While the illustration of the second positioning state for all of the structures is omitted herein, it is the same as the case of the four primary colors described above. That is, with the structure of the 6×6 sub-pixels shown in FIG. 22A, signals corresponding to parallax images of four viewpoints as a total of two viewpoints in the first direction×two viewpoints in the second direction are inputted for both of the positioning states. With the structure of the 9×9 sub-pixels shown in FIG. 22B, signals corresponding to parallax images of nine viewpoints as a total of three viewpoints in the first direction×three viewpoints in the second direction are inputted for both of the positioning states. At that time, all of the sub-pixel groups 41" to 44" shown in FIG. 22A and the sub-pixel groups 411' to 433' shown in FIG. 22B are constituted with the three primary colors, so that it is possible to acquire such an effect that there is no difference generated in the number of displayed colors among each of the viewpoint images within a pixel.

Further, as shown in FIG. 22A, the lens array element 51' is disposed at the position corresponding to the pixel 20A', so that the exit light can be distributed in the directions of the two viewpoints both in the first and second directions. Similarly, as shown in FIG. 22B, the lens array element 51" is disposed at the position corresponding to the pixel 20A", so that the exit light can be distributed in the directions of the three viewpoints both in the first and second directions. Note that the sub-pixel group in the case of the four primary colors is constituted with the four sub-pixels while the sub-pixel group in the case of the three primary colors is constituted with nine sub-pixels. This is for setting the number of viewpoints of the horizontal and vertical parallax in the first positioning state and the second positioning state to be the same.

Based on the content described above, the relative relationships will generally be written as follows provided that the number of primary colors is defined as M, the number of viewpoints in the horizontal parallax display is N, the number of horizontal viewpoints and the number of vertical viewpoints in the horizontal and vertical parallax display are defined as L, the number of total viewpoints in the horizontal and vertical parallax display is defined as J (=L×L), and the number of sub-pixels of the sub-pixel group per direction in the horizontal and vertical parallax display is defined as K. Note here that the number N of viewpoints is the number of viewpoints in a case of only the horizontal parallax display, which corresponds to the number of sub-pixels within a pixel per direction. Further, FIG. 23 that shows a summarized table of the relative relationships will be referred as necessary.

First, in a case where √M that is a square root of the number M of the primary colors is an integer, K=√M. In a case where √M is not an integer, K=M. For example, √M becomes an integer in a case where M=1, 4, 9, so that K=1, 2, 3. √M does not become an integer in a case where M=2, 3, so that K=2, 3 (FIG. 23).

Next, the number of horizontal viewpoints and the number of vertical viewpoints in the horizontal and vertical parallax display can be expressed as L=N/K (where L is a natural number of 2 or larger). For example, in a case of the pixel 21A shown in FIG. 20, L=4/2=2. In a case of the pixel 21A' shown in FIG. 21, L=8/2=4. In a case of the pixel 20A' shown in FIG. 22A, L=6/3=2. In a case of the pixel 20A" shown in FIG. 22B, L=9/3=3 (FIG. 23).

As described above, the structure is employed with which the number L of the horizontal and vertical viewpoints per direction becomes a multiple of the number K of the sub-pixels of the sub-pixel group per direction in the horizontal and vertical parallax display. Therefore, it is possible to acquire such an effect that no color moiré is generated on the displayed images.

The number of horizontal and vertical viewpoints per direction can be made large when √M that is a square root of the number M of the primary colors is an integer (M=1, 4, 9, - - - ) in the horizontal and vertical parallax display, so that it is a preferable structure. Further, a combination (structural example A or D of the pixels in FIG. 23) where J (L×L) and N are equal is preferable for securing the 3D resolution, since the number of sub-pixels (PH in FIG. 23) within a sub-pixel in the horizontal parallax display and the number of sub-pixels (PHV in FIG. 23) within a sub-pixel group in the horizontal and vertical parallax display are the same in a single viewpoint image display and are the same as the number M of the primary colors.

Then, light-ray separation in a case of viewpoint development with the two horizontal viewpoints and two vertical viewpoints will be described by referring to FIG. 24 which shows the pixel structure same as that of FIG. 20. The pixel 21A constituted with the sub-pixel groups 41', 42', 43', 44' and the lens array element 52 corresponding thereto employs the same structures as those of FIG. 20A.

Figure 24:
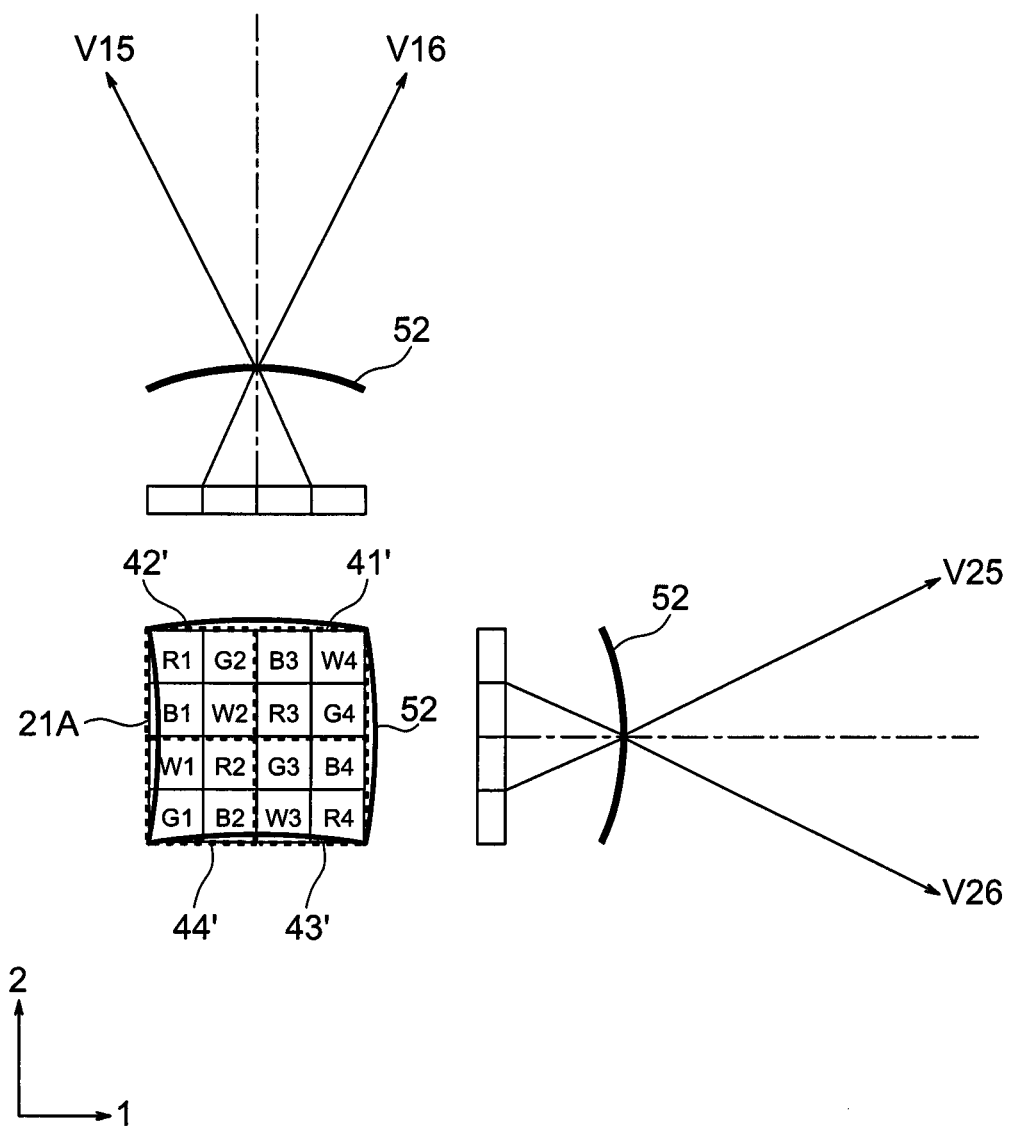
FIG. 24 shows illustrations regarding light-ray separation done by the lens array element corresponding to the pixel having the structure of 4×4 sub-pixels disclosed in FIG. 20A.

In the first positioning state of the case of the development of two horizontal viewpoints and two vertical viewpoints shown in FIG. 24, the parallax images from the sub-pixel groups 41' and 42' and the parallax images from the sub-pixel groups 43' and 44' are separated into light rays in the directions of V15 and V16 via the lens array element 52, respectively, while the parallax images from the sub-pixel groups 43' and 41' and the parallax images from the sub-pixel groups 44' and 42' are separated into light rays in the directions of V25 and V26 via the lens array element 52, respectively. Thereby, parallax is given to both the horizontal direction and the vertical direction.

In FIG. 20 and the like and the explanations provided by referring to those, the cases of employing the fly-eye lens as the lens array element 52 are presented. However, the fourth exemplary embodiment can also employ a static optical separation module or an active optical separation module as in the case of the first exemplary embodiment described above. In particular, in a preferred embodiment, the active optical separation module such as a liquid crystal lens element or a liquid crystal barrier element capable of performing optical separation in the first direction and the second direction can be used.

Further, while the first exemplary embodiment employs the structure with which the light-ray separation is performed only in the first direction but not in the second direction for the first positioning state, for example, when using the active optical separation module, the fourth exemplary embodiment needs to perform light-ray separation simultaneously for both the first and second directions since the parallax is given to both in the horizontal direction and the vertical direction as shown in FIG. 21.

Thus, the structure regarding the light-ray separation according to the fourth exemplary embodiment will be described by referring to the terminal device 60 that is provided with the stereoscopic image display device 10 shown in FIG. 12 and referring to the display controller 12 and the like shown in FIG. 13.

The image generating unit 100 is structured to generate 2D data or 3D data according to the visual field judgment signal from the judging unit 90 and to output the data to the display panel driving circuit 110.

When outputting the 3D data, the sub-pixels corresponding to each of the viewpoints change for the first positioning state and the second positioning state as described above by referring to FIG. 20A and FIG. 20B. Thus, the image generating unit 100 outputs the image data corresponding to such change to the display panel driving circuit 110.

Further, at the same time, the image generating unit 100 is structured to transmit a command signal for enabling the liquid crystal lens for the first direction and the second direction to the image distribution control circuit 111, when the terminal device 60 is in the first positioning state shown in FIG. 12A or in the second positioning state shown in FIG. 12B.

In the meantime, the image generating unit 100 is structured to transmit a command signal for disabling the liquid crystal lens to provide flat display to the image distribution control circuit 111 simultaneously with the output to the display panel driving circuit 110, when the terminal device 60 is outside of the stereopsis region as shown in FIG. 12C.

For selecting the case of N-viewpoints development only in the horizontal direction (referred to as horizontal N-viewpoints development hereinafter) as shown in the first exemplary embodiment and the case of L-viewpoints each (L=N/K) in the horizontal direction and the vertical direction (J-viewpoints in total) shown in the fourth exemplary embodiment (referred to as horizontal and vertical J-viewpoints development), the external IF 104 within the image generating unit 100 shown in FIG. 13 is structured to function effectively. For example, it is possible to employ a structure with which the external IF 104 receives a selection signal outputted from outside by a command or the like from the observer, and the image generating unit 100 generates the image data based on the information included in the selection signal.

Therefore, the image data generating method done by the image generating unit 100 according to the fourth exemplary embodiment is a structure that is acquired by adding a method which changes the position of the virtual camera according to the selection signal received from the outside to the generating method described in the first exemplary embodiment.

Thereby, the calculator 101 sets the virtual camera for the N-viewpoints only in the horizontal direction in the case of the horizontal N-viewpoints development, and sets the virtual camera for L-viewpoints each in the horizontal direction and in the vertical direction (a total of L×L viewpoints: J-viewpoints) in the case of the horizontal and vertical J-viewpoints development. At the same time, the calculator 101 generates the image data by performing rendering processing in each of the cases.

Fifth Exemplary Embodiment

A fifth exemplary embodiment of an image display device according to the present invention will be described by referring to FIG. 25 and FIG. 26. Note here that same reference numerals are used for the structural elements equivalent to those of the first exemplary embodiment described above.

As in FIG. 23 described above, FIG. 26 generally shows the relative relationships provided that the number of primary colors is defined as M, the number of viewpoints in the horizontal parallax display is defined as N, the number of sub-pixels of the sub-pixel group in the horizontal parallax display is defined as PH, the number of sub-pixels of the sub-pixel group in the horizontal and vertical parallax display is defined as PHV, the number of horizontal viewpoints in the horizontal and vertical parallax display is defined LH, the number of vertical viewpoints is defined as LV, and the number of total viewpoints is defined as J (=LH×LV).

(Overall Structure)

As an example different from the case of FIG. 22A shown in the fourth exemplary embodiment, by taking the structure of 6×6 sub-pixels constituted with the three primary colors shown in FIG. 3A as the base, FIG. 25A shows a structure constituted with sub-pixel groups 441, 442, 443, 444, 451, 452, 453, 454, 461, 462, 463 and 464 for the first positioning state, and FIG. 25B shows a structure constituted with sub-pixels 445, 446, 447, 455, 456, 457, 465, 466, 467, 475, 476, and 477 for the second positioning state, respectively. While each of the sub-pixel groups shown in FIG. 22A of the fourth exemplary embodiment described above is constituted with nine sub-pixels, the number of sub-pixels constituting each of the sub-pixel groups 441 to 477 according to the fifth exemplary embodiment is set as "3" that is the same as the number M of the primary colors.

In the first positioning state, signals corresponding to the images of twelve viewpoints as a total of four viewpoints in the horizontal direction that is the first direction and three viewpoints in the vertical direction that is the second direction are inputted. In the second positioning state, signals corresponding to the images of twelve viewpoints as a total of three viewpoints in the horizontal direction that is the second direction and four viewpoints in the vertical direction that is the first direction are inputted.

Regarding the horizontal and vertical parallax display in the fourth exemplary embodiment (FIG. 22), the number of horizontal viewpoints (LH) and the number of vertical viewpoints (LV) are the same in the first positioning state and the second positioning state. Thereby, the total numbers J of the horizontal and vertical viewpoints (=LH×LV) become the same. Specifically, as shown in FIG. 26, LH=2, LV=2 in both of the pixel structural examples C and C'. Thus, the horizontal and vertical viewpoint numbers J in the first and the second layouts states are both "4".

In the meantime, the fifth exemplary embodiment (FIG. 25) employs the structure with which the number of horizontal viewpoints (LH) and the number of vertical viewpoints (LV) are different for the first positioning state and the second positioning state, while the total numbers J of the horizontal and vertical viewpoints become the same. Specifically, as shown in FIG. 26, LH=4, LV=3 in the pixel structural example G, and the number J of the horizontal and vertical viewpoints is 12. Further, LH=3, LV=4 in the pixel structural example G', and the number J of the horizontal and vertical viewpoints is 12. That is, the horizontal and vertical viewpoint numbers J in the first and the second positioning states are both "12".

Further, the lens array 51' is arranged at the position corresponding to the pixel 20A', so that the exit light can be distributed significantly in the first and the second directions.

The image generating unit 100 provided to the display controller 12 shown in FIG. 13 in the fifth exemplary is structured: to have a value acquired by dividing a square of N by the number M of the primary colors as the number of total viewpoints (J) of the pixel; to generate an image having M viewpoints in either the first direction or the second direction; and to generate an image having the number of viewpoints corresponding to the quotient acquired by dividing the number of total viewpoints (J) by M in the other direction. Thereby, the images of parallax for J-viewpoints corresponding to the product of the viewpoints according to each of the first direction and the second direction can be generated. In FIG. 25, employed is the structure with which the images of M (3 herein) viewpoints are generated in the second direction and images of viewpoints corresponding to the quotient acquired by dividing the number of total viewpoints (J) by M (12/3=4 in herein) in generated in the first direction.

(Effects and the Like of the Fifth Exemplary Embodiment)

In the fifth exemplary embodiment, the number of horizontal viewpoints and the number of vertical viewpoints are different in the first positioning state and the second positioning state. Thus, unlike the cases of the first to the fourth exemplary embodiments, the degrees of the 3D resolution are not the same for both positioning states with the fifth exemplary embodiment. However, it is structured to have the same total numbers of the horizontal and vertical viewpoints, so that the difference in the degrees of the 3D resolution between each of the positioning states is small. Further, regarding the number of the sub-pixels constituting the sub-pixel group, there is no such restriction as "M×M, when $\sqrt{M}$ is not an integer" which is shown in the fourth exemplary embodiment. Thus, even in a case where $\sqrt{M}$ is not an integer, it is possible to increase the number of horizontal viewpoints and the number of vertical viewpoints. This allows the observer to visually recognize significant stereoscopic images.

Further, like the content of the explanations provided regarding the first exemplary embodiment, it is also possible to employ a structure with which: display target data of both the horizontal N-viewpoints development and the horizontal and vertical J-viewpoints development on which rendering processing is performed in advance are stored in the data accumulation unit 102 in advance; and the calculator 101 selectively reads out the appropriate data from the accumulated display target data based on the selection signal received at the external IF 104.

This makes it possible to switch the horizontal N-viewpoints development and the horizontal and vertical J-viewpoints development based only on the external information without changing the pixels and the optical separation module. Therefore, it is possible to provide an effective image expression according to the types of the images and contents.

Other structures and actions thereof are the same as those of the first exemplary embodiment, and other operational effects generated thereby are also the same.

Sixth Exemplary Embodiment

A sixth exemplary embodiment of a stereoscopic image display device according to the present invention will be described by referring to FIG. 27 to FIG. 30. Note here that same reference numerals are used for the structural elements equivalent to those of the first exemplary embodiment described above.

(Overall Structure)

Figure 27:
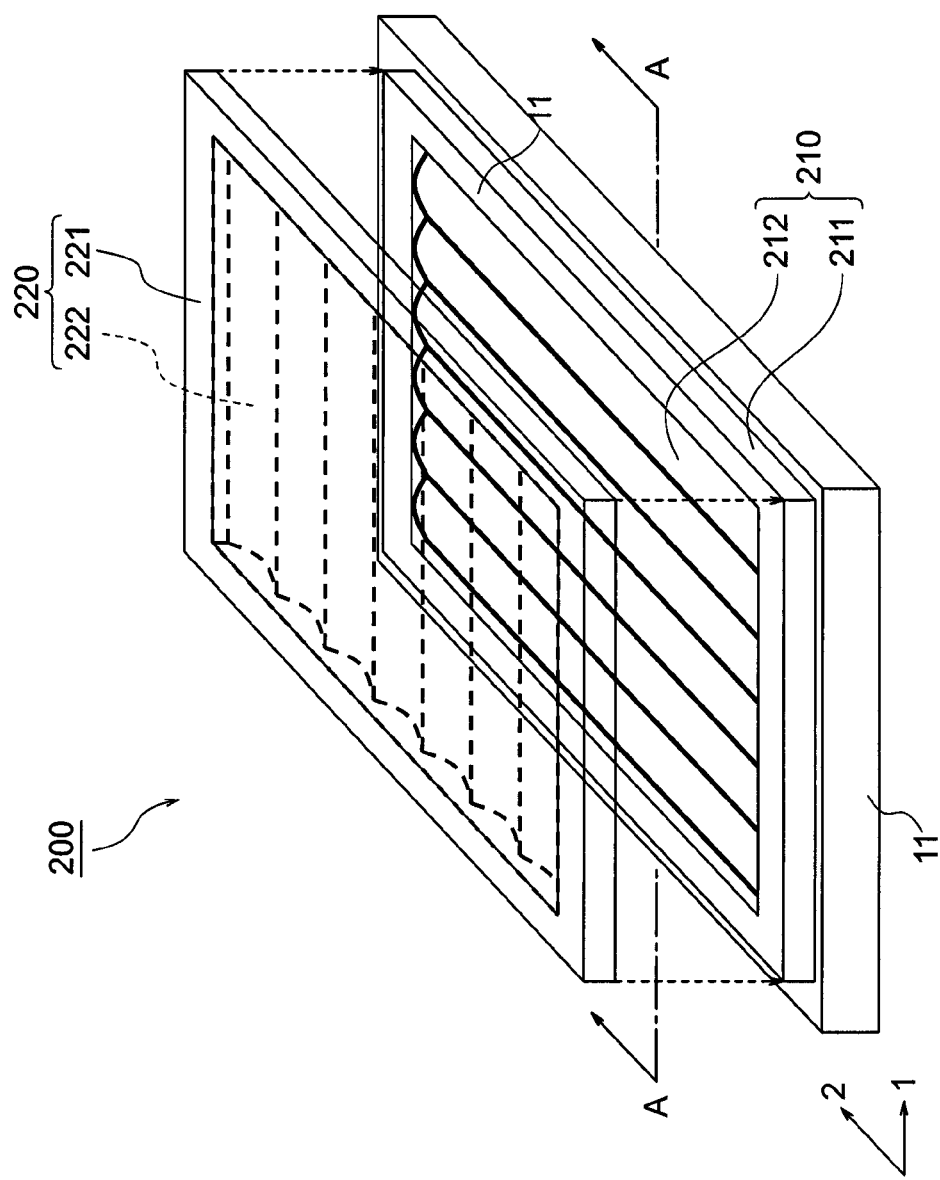
FIG. 27 is a schematic diagram showing the structure of a stereoscopic image display device according to a sixth exemplary embodiment of the present invention.

Unlike the stereoscopic image display device 10 shown in FIG. 1, the stereoscopic image display device according to the sixth exemplary embodiment employs a member formed by bonding two lenticular lens substrates as an optical separation module as shown in FIG. 27.

That is, as shown in FIG. 27, an image display device 200 according to the sixth exemplary embodiment includes the display panel 11 that is the same structural member as that of the first exemplary embodiment described above. At the same time, the image display device 200 is characterized to include, on the display surface side of the display panel 11, a first lenticular lens substrate 210 that distributes exit light from each pixel towards the first direction, and further to include thereon a second lenticular lens substrate 220 that distributes exit light from each pixel towards the second direction.

The first lenticular lens substrate 210 is constituted with first cylindrical lenses 212 arranged in the first direction and a first lens circumferential flat part 211 provided by surrounding the first cylindrical lenses 212. The second lenticular lens substrate 220 is constituted with second cylindrical lenses 222 arranged in the second direction and a second lens circumferential flat part 221 provided by surrounding the first cylindrical lenses 222.

The first direction herein is the arranging direction of the first cylindrical lenses 212, and the second direction vertical thereto is the arranging direction of the second cylindrical lenses 222. That is, those directions respectively indicate the same directions as those of the first exemplary embodiment, which correspond to reference numerals 1 and 2 applied along with arrows in FIG. 27.

The first and second lenticular lens substrates 210 and 220 are disposed in such a manner that the convex surfaces of the first cylindrical lenses 212 and the convex surfaces of the second cylindrical lenses 222 are facing with each other. Further, for clearly showing the structural contents of each of the substrates (210 and 220), a state of providing a specific space between the first lenticular lens substrate 210 and the second lenticular lens substrate 220 (a state before being bonded) is shown in FIG. 27 for convenience. Actually, as shown in FIG. 28 which is a fragmentary sectional view taken along a line A-A of FIG. 27, the first lens circumferential flat part 211 and the second lens circumferential flat part 221 are bonded so that both substrates (210 and 220) are in a bonded structure.

For bonding both the substrates (210 and 220), an adhesive or a sticking agent may be used for each of the lens circumferential flat parts (211 and 221). It is also possible to directly bond those when a material exhibiting an adhesive property or a sticking property is employed for the material that constitutes each of the lens circumferential flat parts (211 and 221).

Figure 28A:
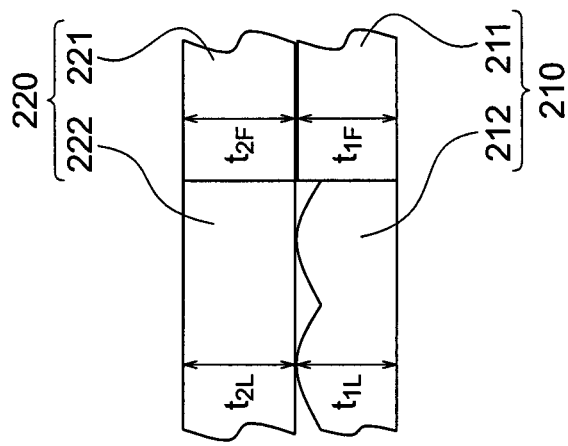
Figure 28B:
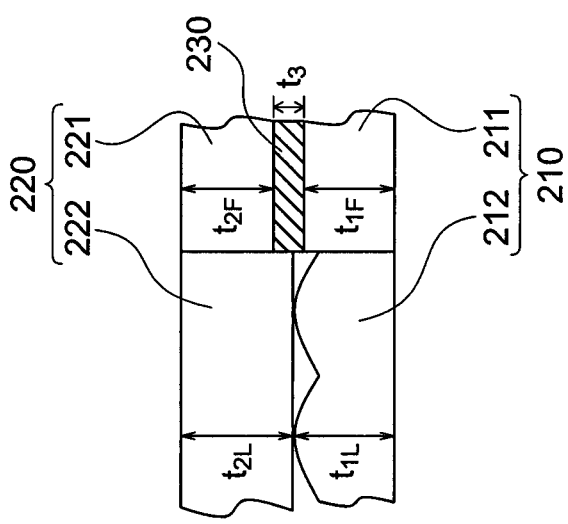

That is, as shown in FIG. 28A, both substrates may be bonded by opposing the first lenticular lens substrate 210 and the second lenticular lens substrate 220 to each other, applying an adhesive or a sticking agent 230 to one of or both of the lens circumferential parts (211, 221), and abutting those to each other. As shown in FIG. 28B which shows a case where the material constituting each of the lens circumferential parts (211 and 221) exhibits an adhesive property or a sticking property, both substrates may be bonded directly.

As shown in FIG. 28, provided that the height of the first cylindrical lens 212 for separating light rays in the first direction is defined as $t_{1L}$, the height of the first lens circumferential flat part 211 is defined as $t_{1F}$, the height of the second cylindrical lens 222 for separating light rays in the second direction is defined as $t_{2L}$, the height of the second lens circumferential flat part 221 is defined as $t_{2F}$, and the thickness of the adhesive or the sticking agent 230 is defined as $t_3$, it is desirable to set the height of each of the lens circumferential parts (211 and 221) to satisfy following expressions (1) or (3) in a case shown in FIG. 28A. That is, it is preferable that the sum of the difference acquired by subtracting $t_{1F}$ from $t_{1L}$ and the difference acquired by subtracting $t_{2F}$ from $t_{2L}$ becomes $t_3$ or smaller.

(Expression 1)

$$(t_{1L}-t_{1F})+(t_{2L}-t_{2F}) \le t_3 \quad (1)$$

Further, in a case where the height relations between the cylindrical lenses and the lens circumferential flat parts for both substrates are equivalent, i.e., in a case where the difference between the height of the cylindrical lens (212 or 222) and the height of the lens circumferential flat part (211 or 221) is equivalent in each substrate (210 or 220), the relation of following expression (2) which shows the equivalent difference as $\Delta t$ applies. By applying this expression (2) to the above-described expression (1), following expression (3) can be derived.

(Expression 2)

$$\Delta t = (t_{1L}-t_{1F}) = (t_{2L}-t_{2F}) \quad (2)$$

(Expression 3)

$$2\Delta t \le t_3 \quad (3)$$

With the same definitions described above, it is desirable to set the height for each of the cylindrical lenses (212 and 222) and each of the lens circumferential flat parts (211 and 221) to satisfy following expression (4) or expression (5) for the case of FIG. 28B. This expression (5) shows a preferable relation of a case where the height relations between the cylindrical lenses and the lens circumferential flat parts are the same for both substrates.

(Expression 4)

$$(t_{1L}+t_{1L}) \le (t_{1F}+t_{2F}) \quad (4)$$

(Expression 5)

$$t_{1L} \le t_{1F}, t_{2L} \le t_{2F} \quad (5)$$

In a case where the relations of expressions (1) and (3) and expressions (4) and (5) are not satisfied, i.e., in a case where the left sides become larger than the right sides in each of those expressions, the cylindrical lenses (212 and 222) are crushed and the lens functions thereof are damaged. Further, when the right sides become extremely larger than the left sides in each of the expressions, the gap between the cylindrical lenses of both substrates becomes increased. In such case, the light-ray separating performance of the second lenticular lens 222 is greatly deteriorated.

According to the experiments done by the inventors of the present invention, the gap between the cylindrical lenses of each of the substrates is desirable to be 300 μm or less in order to secure the prescribed 3D crosstalk property. More desirably, the gap is desirable to be 100 μm or less.

Next, the layout relation between each pixel constituted with the four primary colors and the first and second lenticular lenses will be described by referring to FIG. 29.

Figure 29B:
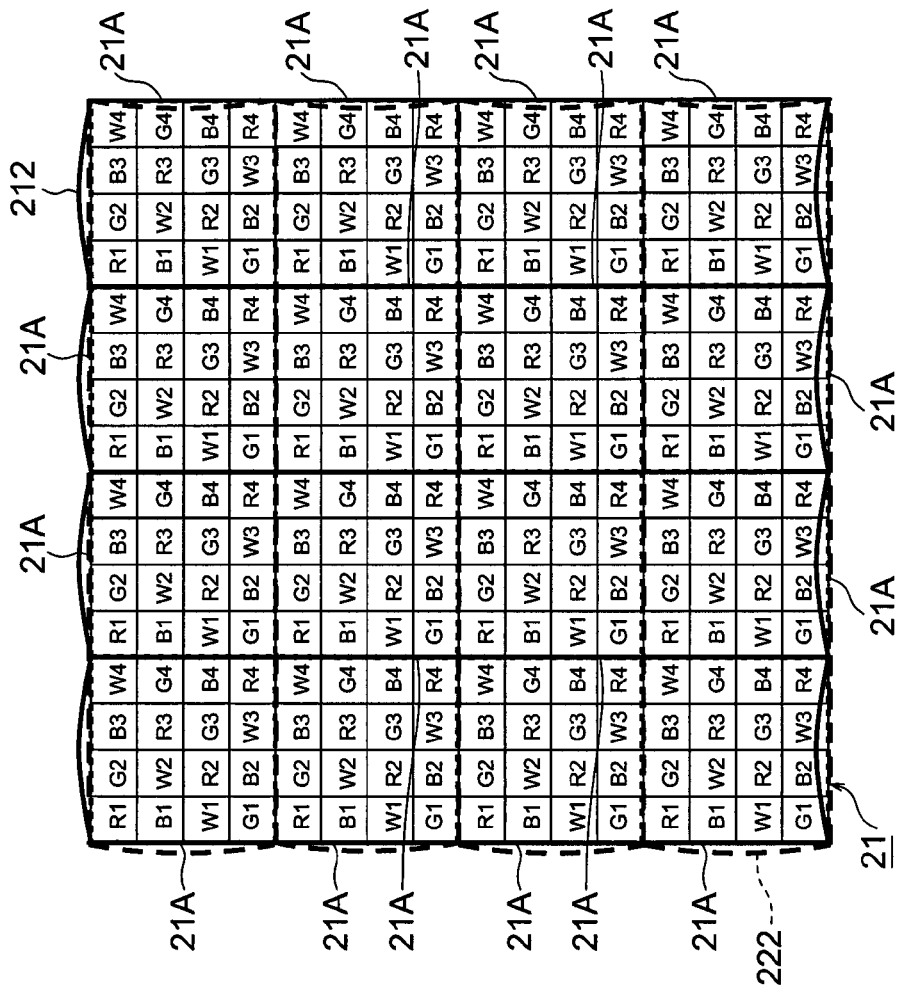
Figure 29A:
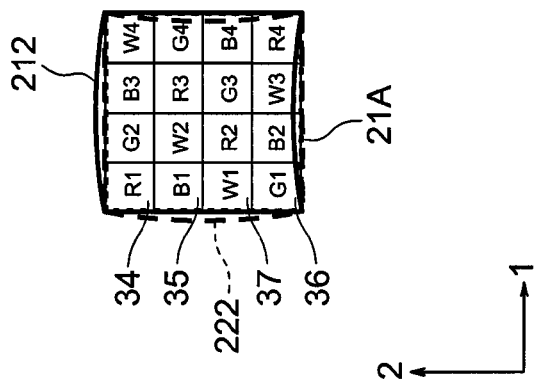

As shown in FIG. 29A, the pixel 21A constituted with the four primary colors of red sub-pixels 34, blue sub-pixels 35, green sub-pixels 36, and white sub-pixels 37 includes 4×4 sub-pixels inside thereof.

Further, as shown in FIG. 29B, each of the first cylindrical lenses 212 is disposed at the position corresponding to each of the pixels 21A which constitute the pixel matrix 21, and it is structured to distribute the exit light in the directions of four viewpoints for the first direction. Further, each of the second cylindrical lenses 222 is also disposed at the position corresponding to each of the pixels 21A, and it is capable of distributing the exit light in the directions of four viewpoints for the second direction.

That is, each of the pixels 21A arranged as a matrix and the first as well as the second cylindrical lenses 212, 222 are disposed in a corresponding manner, and each of the pixels 21A and the first as well as the second cylindrical lenses 212, 222 are arranged parallel and at a same pitch for the first direction and the second direction, respectively.

Figure 30:
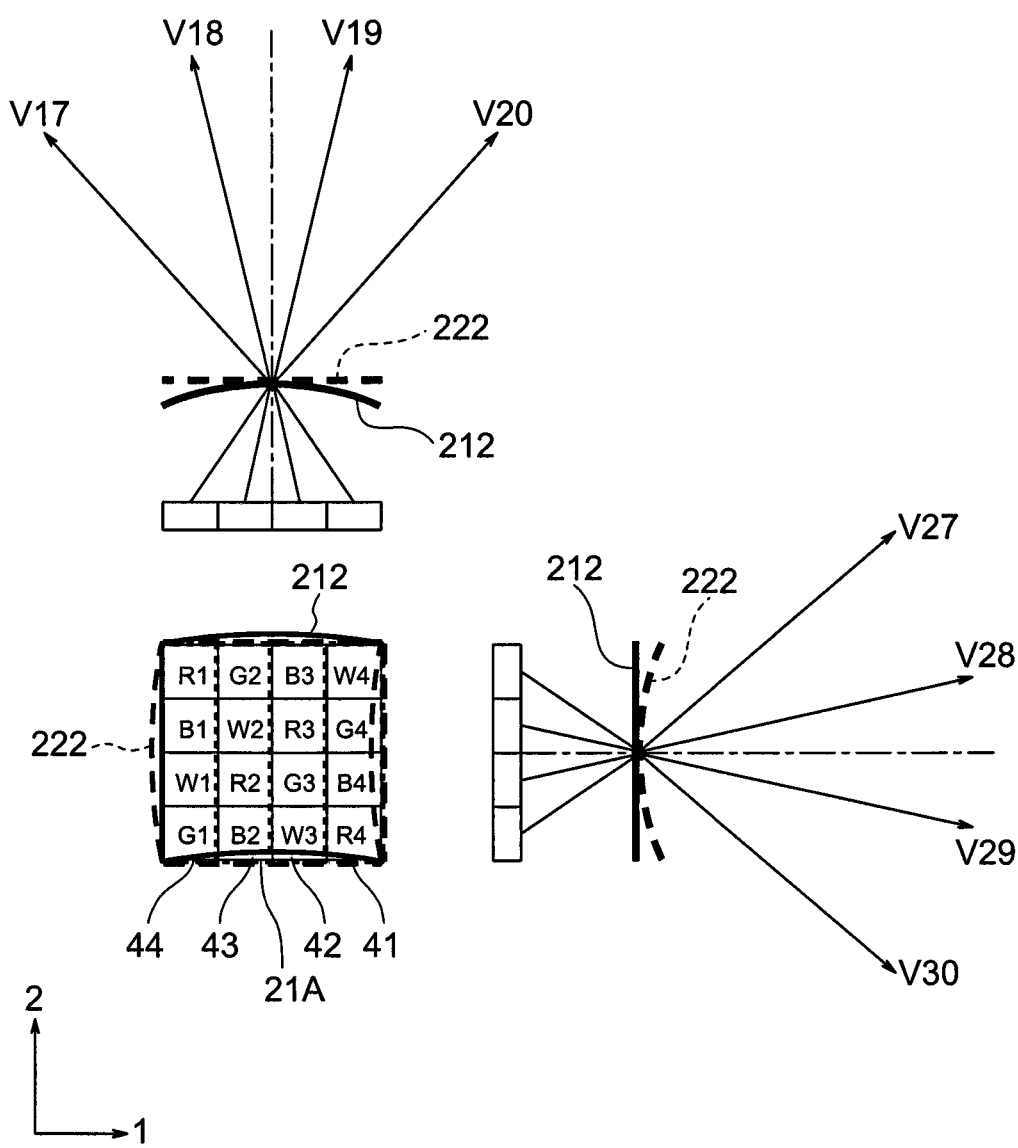
FIG. 30 shows illustrations regarding light-ray separation done by a lens array element corresponding to the pixel disclosed in FIG. 29A.

Next, referring to FIG. 30 which shows the state of light-ray separation done by the first and second cylindrical lenses (212 and 222) corresponding to the pixels 21A shown in FIG. 29A, each of the parallax images from the sub-pixel groups 41, 42, 43, and 44 is separated into light rays (distributed) in the directions of V17, V18, V19, and V20 via the first cylindrical lens 212 in the first positioning state where the first direction is set as the horizontal direction. Thereby, stereopsis can be achieved. The second cylindrical lens 222 in the first positioning state has a specific thickness along the first direction, so that the exit light from the pixel 21A is not separated into light rays via the second cylindrical lens 222.

Similarly, each of the parallax images from the pixel 21A is separated into light rays (distributed) in the directions of V27, V28, V29, and V30 via the second cylindrical lens 222 in the second positioning state where the second direction is set as the horizontal direction. Thereby, stereopsis can be achieved. Similarly, the exit light from the pixel 21A in the second positioning state is not separated into light rays via the first cylindrical lens 212.

Each of the structural contents employed in the sixth exemplary embodiment can also be applied to each of the stereoscopic image display devices of the second, fourth, and fifth exemplary embodiments described above.

(Effects and the Like of the Sixth Exemplary Embodiment)

The sixth exemplary embodiment employs the two lenticular lens substrates having the cylindrical lenses as the optical separation module, so that it is possible to distribute the exit light from each of the pixels in a significant manner for both the first and second directions without using the active element.

Further, die patterns of the lenticular lenses employed herein are easy to be fabricated in a highly accurate manner compared to the case of a fly-eye lens. As a result, the precision of the lens pitch and the radius curvature can be increased.

Furthermore, the sixth exemplary embodiment employs the structure in which the lens circumferential parts are provided to the lenticular lens substrates, so that the two lenticular lenses can be unified in an extremely precise manner. This makes it possible to provide a stereoscopic image display device which can provide stereopsis of a high image quality.

Other structures and actions thereof are the same as those of the first exemplary embodiment, and other operational effects generated thereby are also the same.

Each of the above-described exemplary embodiments shows preferable specific examples of the stereoscopic image display device, the stereoscopic image display method, and the program therefor, and various kinds of technically preferred restrictions may be applied therein. However, the technical scope of the present invention is not limited only to those modes unless there is no specific statement for restricting the present invention.

While the new technical contents regarding the above-described exemplary embodiments can be summarized as follows, the present invention is not limited only to those.

(Supplementary Note 1)

A stereoscopic image display device, including:

a display panel in which pixels each constituted with N×N pieces (N is a natural number of 2 or larger) of sub-pixels colored in M (M is a natural number of 1 or larger) primary colors are arranged as a matrix; and an optical separation module in which optical elements which distribute exit light from each of the pixels according to parallax images in a first direction and a second direction along layout of the pixels are arranged to correspond to each of the pixels, wherein:

the sub-pixels neighboring to each other within each of the pixels are of different colors from each other;

array pitches of the sub-pixels are uniform in the first and second directions;

same numbers of the parallax images are displayed for each of the first direction and the second direction within each of the pixels; and numbers of the sub-pixels in different colors within the parallax images are equivalent.

(Supplementary Note 2)

The stereoscopic image display device as depicted in Supplementary Note 1, wherein a remainder acquired by dividing the N by the M is 0 (N mod M=0 is satisfied).

(Supplementary Note 3)

The stereoscopic image display device as depicted in Supplementary Note 1, wherein the N that is the number of viewpoints within the pixel is a multiple of the M.

(Supplementary Note 4)

The stereoscopic image display device as depicted in any one of Supplementary Notes 1 to 3, wherein:

the first direction and the second direction are in an orthogonal relation; and each of the optical elements is arranged in such a manner that a shape formed by connecting centers of the three optical elements neighboring to each other is in an isosceles triangle that is laterally symmetric with respect to either the first direction or the second direction.

(Supplementary Note 5)

The stereoscopic image display device as depicted in Supplementary Note 4, wherein:

instead of the matrix layout, each of the pixels is arranged in such a manner that a shape formed by connecting centers of the three pixels neighboring to each other is in an isosceles triangle that is laterally symmetric with respect to either the first direction or the second direction.

(Supplementary Note 6)

The stereoscopic image display device as depicted in any one of Supplementary Notes 1 to 3, wherein:

the sub-pixel is formed in a rhombic form; and the pixels on the display panel are arranged to form a rhombic form as a whole instead of the matrix layout.

(Supplementary Note 7)

The stereoscopic image display device as depicted in any one of Supplementary Notes 1 to 6, wherein:

between each of the neighboring pixels, color layout of the sub-pixels is different; and the sub-pixels of the pixels neighboring to each other at a boundary of each of the pixels are of different colors from each other.

(Supplementary Note 8)

The stereoscopic image display device as depicted in any one of Supplementary Notes 1 to 7, wherein the M pieces of the pixels having the sub-pixels of different color layout are combined and arranged periodically in each of the first direction and the second direction.

(Supplementary Note 9)

The stereoscopic image display device as depicted in any one of Supplementary Notes 1 to 7, wherein the pixels having the sub-pixels of different color layout are combined in the M-piece cycles and arranged in each of the first direction and the second direction.

(Supplementary Note 10)

The stereoscopic image display device as depicted in any one of Supplementary Notes 1 to 7, wherein the cycle for arranging the pixels having the sub-pixels of different color layout in each of the first direction and the second direction is the M-piece cycle.

(Supplementary Note 11)

The stereoscopic image display device as depicted in any one of Supplementary Notes 1 to 7, wherein the pixels having the sub-pixels of different color layout are arranged in a combination of the M-pieces per cycle in each of the first direction and the second direction.

(Supplementary Note 12)

The stereoscopic image display device as depicted in any one of Supplementary Notes 8 to 11, wherein:

the number of color layout patterns of the sub-pixels is the same as the number of the primary colors.

(Supplementary Note 13)

The stereoscopic image display device as depicted in any one of Supplementary Notes 1 to 12, wherein:

the optical element provided to the optical separation module always distributes the exit light for the first direction and the second direction.

(Supplementary Note 14)

The stereoscopic image display device as depicted in Supplementary Note 13, wherein:

the optical element provided to the optical separation module includes a first lenticular lens substrate which distributes the exit light for the first direction and a second lenticular lens substrate which distributes the exit light for the second direction.

(Supplementary Note 15)

The stereoscopic image display device as depicted in Supplementary Note 14, wherein:

the first lenticular lens substrate includes a first cylindrical lens for separating light rays in the first direction and a first lens circumferential flat part provided by surrounding circumference of the first cylindrical lens;

the second lenticular lens substrate includes a second cylindrical lens for separating light rays in the second direction and a second lens circumferential flat part provided by surrounding circumference of the second cylindrical lens; and a convex surface of the first cylindrical lens and a convex surface of the second cylindrical lens are arranged to face with each other.

(Supplementary Note 16)

The stereoscopic image display device as depicted in Supplementary Note 15, wherein:

the first lens circumferential flat part and the second lens circumferential flat part are in a bonded or glued state.

(Supplementary Note 17)

The stereoscopic image display device as depicted in any one of Supplementary Notes 1 to 12, wherein:

the optical element provided to the optical separation module is an electro-optic element which is capable of controlling distribution of the exit light individually for the first direction and the second direction.

(Supplementary Note 18)

The stereoscopic image display device as depicted in any one of Supplementary Notes 1 to 16, further including a display controller which generates and outputs parallax images for the first direction and the second direction.

(Supplementary Note 19)

The stereoscopic image display device as depicted in Supplementary Note 18, wherein the display controller includes:

a detection unit which detects displacement of a device main body including the display panel;

a judging unit which judges whether or not both eyes of an observer are located within a stereopsis region set in advance based on displacement information detected by the detection unit;

an image generating unit which generates images having parallax of the N viewpoints when the judging unit judges that both eyes are located within the region; and a display panel driving unit which outputs the images generated by the image generating unit to the display panel.

(Supplementary Note 20)

The stereoscopic image display device as depicted in Supplementary Note 19, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction; and the image generating unit generates the images having parallax for the N-viewpoints corresponding only to the first direction when judged as being in the first positioning state, and generates the images having parallax for the N-viewpoints corresponding only to the second direction when judged as being in the second positioning state.

(Supplementary Note 21)

The stereoscopic image display device as depicted in Supplementary Note 19 or 20, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

the optical separation module is an electro-optical element; and the display controller includes an image distribution control unit which operates the electro-optical element only for the first direction when judged as being in the first positioning state, and operates the electro-optical element only for the second direction when judged as being in the second positioning state.

(Supplementary Note 22)

The stereoscopic image display device as depicted in Supplementary Note 19 or 20, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

the optical separation module is an electro-optic element; and the display controller includes an image distribution control unit which operates the electro-optic element to distribute the exit light to each of directions including the first direction on a plane vertical to the display panel in a case of the first positioning state, and operates the electro-optic element to distribute the exit light to each of directions including the second direction on a plane vertical to the display panel in a case of the second positioning state.

(Supplementary Note 23)

The stereoscopic image display device as depicted in Supplementary Note 19, wherein: the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction; and in the first and the second positioning states, when a square root $\sqrt{M}$ of the M that is the number of primary colors becomes an integer, the image generating unit takes a quotient (L) acquired by dividing the N by the $\sqrt{M}$ as number of viewpoints in the horizontal direction and in a vertical direction that is in an orthogonal relation with the horizontal direction, and generates images having parallax for the number of viewpoints corresponding to each of the first and second directions, and when the square root $\sqrt{M}$ of the M does not become an integer, the image generating unit takes a quotient (L) acquired by dividing the N by the M as number of viewpoints in the horizontal direction and in the vertical direction, and generates images having parallax for the number of viewpoints corresponding to each of the first and second directions.

(Supplementary Note 24)

The stereoscopic image display device as depicted in Supplementary Note 19, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

in the first and the second positioning states, the image generating unit takes a quotient acquired by dividing a square of the N by the M as a number of total viewpoints (J) of the pixel, and generates images having parallax for the number of viewpoints corresponding to each of the directions in such a manner that a product of the numbers of viewpoints corresponding to each of the first direction and the second direction becomes the number of total viewpoints (J); and the display panel driving unit outputs the images generated by the image generating unit for each of the first direction and the second direction instead of the same number of parallax images.

(Supplementary Note 25)

The stereoscopic image display device as depicted in Supplementary Note 19, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

in the first and the second positioning states, the image generating unit takes a quotient acquired by dividing a square of the N by the M as a number of total viewpoints (J) of the pixel, generates images having the M viewpoints in either the first or the second direction, and generates images having viewpoints corresponding to a quotient acquired by dividing the number of total viewpoints (J) by the M for the other direction; and the display panel driving unit outputs the images generated by the image generating unit for each of the first direction and the second direction instead of the same number of parallax images.

(Supplementary Note 26)

The stereoscopic image display device as depicted in Supplementary Note 19, wherein:

the image generating unit includes a function which generates images having parallax of N/2-viewpoints;

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction; and the image generating unit generates the images having parallax for the N/2-viewpoints corresponding to each of the first and second directions when judged as being in the first positioning state, and generates the images having parallax for the N/2-viewpoints corresponding to each of the second and first directions when judged as being in the second positioning state.

(Supplementary Note 27)

The stereoscopic image display device as depicted in Supplementary Note 19, wherein:

the optical separation module is an electro-optical element; and the display controller includes an image distribution control unit which operates the electro-optical element for the first and second directions when judged as being in the first positioning state, and operates the electro-optical element for the second and first directions when judged as being in the second positioning state.

(Supplementary Note 28)

The stereoscopic image display device as depicted in Supplementary Note 19, wherein the image generating unit selects and generates either parallax images of the N-viewpoints effective for the horizontal direction or parallax images of the N-viewpoints constituted with an image giving parallax of the N/2-viewpoints for the first direction and an image giving parallax of the N/2-viewpoints for the second direction based on input information from outside.

(Supplementary Note 29)

The stereoscopic image display device as depicted in any one of Supplementary Notes 1 28, wherein the first direction and the second direction are orthogonal to each other.

(Supplementary Note 30)

The stereoscopic image display device as depicted in any one of Supplementary Notes 1 29, wherein the number of primary colors is "3".

(Supplementary Note 31)

The stereoscopic image display device as depicted in any one of Supplementary Notes 1 29, wherein the number of primary colors is "4".

(Supplementary Note 32)

A terminal device, including:

the stereoscopic image display device as depicted in any one of Supplementary Notes 1 to 31; and a casing which houses the stereoscopic image display device inside thereof.

(Supplementary Note 33)

A display controller for controlling actions of a stereoscopic image display device which includes a display panel in which pixels each constituted with N×N pieces (N is a natural number of 2 or larger) of sub-pixels colored in M (M is a natural number of 1 or larger) primary colors are arranged as a matrix, and an optical separation module in which optical elements which distribute exit light from each of the pixels according to parallax images in a first direction and a second direction along layout of the pixels are arranged to correspond to each of the pixels, and the display controller includes:

a detection unit which detects displacement of a device main body including the display panel;

a judging unit which judges whether or not both eyes of an observer are located within a stereopsis region set in advance based on displacement information detected by the detection unit;

an image generating unit which generates images having parallax of the N viewpoints when the judging unit judges that both eyes are located within the region; and a display panel driving unit which outputs the images generated by the image generating unit to the display panel, wherein the image generating unit:

sets the sub-pixels neighboring to each other within each of the pixels to be of different colors from each other;

sets array pitches of the sub-pixels to be uniform in the first and second directions;

displays same numbers of the parallax images for each of the first direction and the second direction within each of the pixels; and sets numbers of the sub-pixels in different colors within the parallax images to be equivalent.

(Supplementary Note 34)

The display controller as depicted in Supplementary Note 33, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction; and the image generating unit generates the images having parallax for the N-viewpoints corresponding only to the first direction when judged as being in the first positioning state, and generates the images having parallax for the N-viewpoints corresponding only to the second direction when judged as being in the second positioning state.

(Supplementary Note 35)

The display controller as depicted in Supplementary Note 33 or 34, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

the optical separation module is an electro-optical element; and the display controller includes an image distribution control unit which operates the electro-optical element only for the first direction when judged as being in the first positioning state, and operates the electro-optical element only for the second direction when judged as being in the second positioning state.

(Supplementary Note 36)

The display controller as depicted in Supplementary Note 33 or 34, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

the optical separation module is an electro-optic element; and the display controller includes an image distribution control unit which operates the electro-optic element to distribute the exit light to each of directions including the first direction on a plane vertical to the display panel in a case of the first positioning state, and operates the electro-optic element to distribute the exit light to each of directions including the second direction on a plane vertical to the display panel in a case of the second positioning state.

(Supplementary Note 37)

The display controller as depicted in Supplementary Note 33, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction; and in the first and the second positioning states, when a square root $\sqrt{M}$ of the M that is the number of primary colors becomes an integer, the image generating unit takes a quotient (L) acquired by dividing the N by the $\sqrt{M}$ as number of viewpoints in the horizontal direction and in a vertical direction that is in an orthogonal relation with the horizontal direction, and generates images having parallax for the number of viewpoints corresponding to each of the first and second directions, and when the square root $\sqrt{M}$ of the M does not become an integer, the image generating unit takes a quotient (L) acquired by dividing the N by the M as number of viewpoints in the horizontal direction and in the vertical direction, and generates images having parallax for the number of viewpoints corresponding to each of the first and second directions.

(Supplementary Note 38)

The display controller as depicted in Supplementary Note 33, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

in the first and the second positioning states, the image generating unit takes a quotient acquired by dividing a square of the N by the M as a number of total viewpoints (J) of the pixel, and generates images having parallax for the number of viewpoints corresponding to each of the directions in such a manner that a product of the numbers of viewpoints corresponding to each of the first direction and the second direction becomes the number of total viewpoints (J); and the display panel driving unit outputs the images generated by the image generating unit for each of the first direction and the second direction instead of the same number of parallax images.

(Supplementary Note 39)

The display controller as depicted in Supplementary Note 33, wherein:

the judging unit includes a function which judges whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction;

in the first and the second positioning states, the image generating unit takes a quotient acquired by dividing a square of the N by the M as a number of total viewpoints (J) of the pixel, generates images having the M viewpoints in either the first or the second direction, and generates images having viewpoints corresponding to a quotient acquired by dividing the number of total viewpoints (J) by the M for the other direction; and the display panel driving unit outputs the images generated by the image generating unit for each of the first direction and the second direction instead of the same number of parallax images.

(Supplementary Note 40)

A stereoscopic image display method used in a stereoscopic image display device which includes: a display panel in which pixels each constituted with N×N pieces (N is a natural number of 2 or larger) of sub-pixels colored in M (M is a natural number of 1 or larger) primary colors are arranged as a matrix; an optical separation module in which optical elements which distribute exit light from each of the pixels according to parallax images in a first direction and a second direction along layout of the pixels are arranged to correspond to each of the pixels; and a display controller which generates and outputs parallax images for the first direction and the second direction along the layout of the pixels on the display panel, and the method includes:

detecting displacement of a device main body including the display panel;

judging whether or not both eyes of an observer are located within a stereopsis region set in advance based on displacement information acquired by the detection;

generating images having parallax of the N-viewpoints when judged that both eyes are within the region; and outputting the generated images to the display panel.

(Supplementary Note 41)

The stereoscopic image display method as depicted in Supplementary Note 40, which includes:

judging whether the device is in a first positioning state where a horizontal direction that is a direction parallel to a straight line connecting between the left eye and the right eye of the observer is substantially parallel to the first direction or in a second positioning state where the horizontal direction is substantially parallel to the second direction as a way of judging whether or both eyes of the observer are located within the stereopsis region set in advance;

generating the images having parallax for the N-viewpoints corresponding only to the first direction when judged as being in the first positioning state; and generating the images having parallax for the N-viewpoints corresponding only to the second direction when judged as being in the second positioning state.

(Supplementary Note 42)

A stereoscopic image display program used in a stereoscopic image display device which includes: a display panel in which pixels each constituted with N×N pieces of sub-pixels colored in M primary colors are arranged as a matrix; an optical separation module which include optical elements corresponding to each of the pixels and distributes exit light from each of the pixels to directions different from each other; and a display controller which generates and outputs parallax images for the first direction and the second direction along the layout of the pixels on the display panel, and the program causes a computer provided to the display controller to function as:

a detection module which detects displacement of a device main body including the display panel;

a judging module which judges whether or not both eyes of an observer are located within a stereopsis region set in advance based on displacement information acquired by the detection; and an image generating module which generates images having parallax of the N-viewpoints when judged that both eyes are within the region.

INDUSTRIAL APPLICABILITY

The stereoscopic image display device according to the present invention can be applied to various kinds of display devices which display images.

What is claimed is:

1. A stereoscopic image display device, comprising:
a display panel in which pixels each constituted with N×N pieces of sub-pixels colored in M primary colors are arranged in a first direction and in a second direction transverse to the first direction, as a matrix; and
an optical separation module in which optical elements which distribute exit light from each of the pixels according to parallax images to a plurality equal to N of viewpoints in each of the first direction and the second direction along a layout of the pixels that is arranged to correspond to each of the pixels in a one-to-one correspondence, wherein:
N is a natural number of 2 or larger;
M is a natural number of 1 or larger;
sub-pixels neighboring each other within each of the pixels are of different colors from each other;
array pitches of the sub-pixels are uniform in the first and second directions;
same numbers of the parallax images are displayed for each of the first direction and the second direction within each of the pixels;
numbers of the sub-pixels in different colors within the parallax images are equivalent;
each neighboring pixel has a different sub-pixel color layout; and
sub-pixels of the pixels neighboring to each other at a boundary of each of the pixels are of different colors from each other.

2. The stereoscopic image display device as claimed in claim 1, wherein
a remainder acquired by dividing a value of N by a value of M is 0 (N mod M=0 is satisfied).

3. The stereoscopic image display device as claimed in claim 1, wherein:
the first direction and the second direction are in an orthogonal relation; and
each of the optical elements is arranged in such a manner that a shape formed by connecting centers of three optical elements neighboring to each other is in an isosceles triangle that is laterally symmetric with respect to either the first direction or the second direction.

4. The stereoscopic image display device as claimed in claim 3, wherein:
each of the pixels is arranged in such a manner that a shape formed by connecting centers of three pixels neighboring to each other is in an isosceles triangle that is laterally symmetric with respect to either the first direction or the second direction.

5. The stereoscopic image display device as claimed in claim 1, wherein:
N number of pieces of the pixels having sub-pixels of different color layout are combined and arranged periodically in each of the first direction and the second direction.

6. The stereoscopic image display device as claimed in claim 1, wherein:
the optical element provided to the optical separation module always distributes the exit light for the first direction and the second direction.

7. The stereoscopic image display device as claimed in claim 6, wherein:
the optical element provided to the optical separation module comprises a first lenticular lens substrate which distributes the exit light for the first direction and a second lenticular lens substrate which distributes the exit light for the second direction.

8. The stereoscopic image display device as claimed in claim 7, wherein:
the first lenticular lens substrate comprises a first cylindrical lens for separating light rays in the first direction and a first lens circumferential flat part provided by surrounding circumference of the first cylindrical lens;

the second lenticular lens substrate comprises a second cylindrical lens for separating light rays in the second direction and a second lens circumferential flat part provided by surrounding circumference of the second cylindrical lens; and a convex surface of the first cylindrical lens and a convex surface of the second cylindrical lens are disposed to face with each other.

9. The stereoscopic image display device as claimed in claim 8, wherein:

the first lens circumferential flat part and the second lens circumferential flat part are in a bonded or glued state.

10. The stereoscopic image display device as claimed in claim 1, wherein:

the optical element provided to the optical separation module is an electro-optic element which is capable of controlling distribution of the exit light individually for the first direction and the second direction.

11. The stereoscopic image display device as claimed in claim 1, further comprising:

a display controller which generates and outputs parallax images for the first direction and the second direction.

12. The stereoscopic image display device as claimed in claim 11, wherein the display controller comprises:

a detection unit which detects displacement of a device main body including the display panel;

a judging unit which judges whether or not both eyes of an observer are located within a stereopsis region set in advance based on displacement information detected by the detection unit;

an image generating unit which generates images having parallax of the plurality of viewpoints when the judging unit judges that the both eyes are located within the region; and a display panel driving unit which outputs the images generated by the image generating unit to the display panel.

13. The stereoscopic image display device as claimed in claim 12, wherein:

the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction; and the image generating unit generates the images having parallax for the plurality of viewpoints corresponding only to the first direction when judged as being in the first positioning state, and generates the images having parallax for the plurality of viewpoints corresponding only to the second direction when judged as being in the second positioning state.

14. The stereoscopic image display device as claimed in claim 13, wherein:

the optical separation module is an electro-optic element; and the display controller comprises an image distribution control unit which operates the electro-optic element to distribute the exit light to each of directions including the first direction on a plane vertical to the display panel in a case of the first positioning state, and operates the electro-optic element to distribute the exit light to each of directions including the second direction on a plane vertical to the display panel in a case of the second positioning state.

15. The stereoscopic image display device as claimed in claim 12, wherein:

the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction; and in the first and the second positioning states, when a square root $\sqrt{M}$ of a value of M becomes an integer, the image generating unit takes a quotient (L) acquired by dividing a value of N by a value of $\sqrt{M}$ as a first number of viewpoints in the horizontal direction and in a vertical direction that is in an orthogonal relation with the horizontal direction, and generates images having parallax for the number of viewpoints corresponding to each of the first and second directions, and when the square root $\sqrt{M}$ does not become an integer, the image generating unit takes a quotient (L) acquired by dividing the value of N by the value of M as a second number of viewpoints in the horizontal direction and in the vertical direction, and generates images having parallax for the second number of viewpoints corresponding to each of the first and second directions.

16. The stereoscopic image display device as claimed in claim 12, wherein:

the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction;

in the first and the second positioning states, the image generating unit takes a quotient acquired by dividing a square of a value of N by a value of M as a total number of viewpoints (J) of the pixel, and generates images having parallax for the number of viewpoints corresponding to each of the directions in such a manner that a product of the numbers of viewpoints corresponding to each of the first direction and the second direction becomes the total number of viewpoints (J); and the display panel driving unit outputs the images generated by the image generating unit for each of the first direction and the second direction instead of the same number of parallax images.

17. The stereoscopic image display device as claimed in claim 12, wherein:

the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction;

in the first and the second positioning states, the image generating unit takes a quotient acquired by dividing a square of a value of N by a value of M as a number of total viewpoints (J) of the pixel, generates images having M number of viewpoints in either the first or the second direction, and generates images having viewpoints corresponding to a quotient acquired by dividing the number of total viewpoints (J) by the value of M for the other direction; and the display panel driving unit outputs the images generated by the image generating unit for each of the first direction and the second direction instead of the same number of parallax images.

18. A terminal device, comprising:
the stereoscopic image display device as claimed in claim 1; and
a casing which houses the stereoscopic image display device inside thereof.

19. A display controller for controlling actions of a stereoscopic image display device which comprises a display panel in which pixels each constituted with N×N pieces (N is a natural number of 2 or larger) of sub-pixels colored in M (M is a natural number of 1 or larger) primary colors are arranged in matrix, and an optical separation module in which optical elements which distribute exit light from each of the pixels according to parallax images in a first direction and a second direction along layout of the pixels are arranged by being corresponded to each of the pixels, the display controller comprising:
a detection unit which detects displacement of a device main body including the display panel;
a judging unit which judges whether or not both eyes of an observer are located within a stereopsis region set in advance based on displacement information detected by the detection unit;
an image generating unit which generates images having parallax of N number of viewpoints when the judging unit judges that the both eyes are located within the region; and
a display panel driving unit which outputs the images generated by the image generating unit to the display panel, wherein
the image generating unit:
sets the sub-pixels neighboring to each other within each of the pixels to different colors from each other;
sets array pitches of the sub-pixels uniformly in the first and second directions;
displays same numbers of the parallax images for each of the first direction and the second direction within each of the pixels; and
sets numbers of the sub-pixels in different colors within the parallax images to equivalent,
wherein each neighboring pixel has a different sub-pixel color layout, and
the sub-pixels of the pixels neighboring to each other at a boundary of each of the pixels are of different colors from each other.

20. The display controller as claimed in claim 19, wherein:
the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction; and
the image generating unit generates the images having parallax for the N number of viewpoints corresponding only to the first direction when judged as being in the first positioning state, and generates the images having parallax for the N number of viewpoints corresponding only to the second direction when judged as being in the second positioning state.

21. The display controller as claimed in claim 20, wherein:
the optical separation module is an electro-optic element; and
the display controller comprises an image distribution control unit which operates the electro-optic element to distribute the exit light to each of directions including the first direction on a plane vertical to the display panel in a case of the first positioning state, and operates the electro-optic element to distribute the exit light to each of directions including the second direction on a plane vertical to the display panel in a case of the second positioning state.

22. The display controller as claimed in claim 19, wherein:
the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction; and
in the first and the second positioning states,
when a square root $\sqrt{M}$ of a value of M becomes an integer, the image generating unit takes a quotient (L) acquired by dividing a value of N by a value of $\sqrt{M}$ as a first number of viewpoints in the horizontal direction and in a vertical direction that is in an orthogonal relation with the horizontal direction, and generates images having parallax for the first number of viewpoints corresponding to each of the first and second directions, and
when the square root $\sqrt{M}$ does not become an integer, the image generating unit takes a quotient (L) acquired by dividing the value of N by the value of M as a second number of viewpoints in the horizontal direction and in the vertical direction, and generates images having parallax for the second number of viewpoints corresponding to each of the first and second directions.

23. The display controller as claimed in claim 19, wherein:
the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction;
in the first and the second positioning states,
the image generating unit takes a quotient acquired by dividing a square of a value of N by a value of M as a total number viewpoints (J) of the pixel, and generates images having parallax for a number of viewpoints corresponding to each of the directions in such a manner that a product of the numbers of viewpoints corresponding to each of the first direction and the second direction becomes the total number of viewpoints (J); and
the display panel driving unit outputs the images generated by the image generating unit for each of the first direction and the second direction instead of the same number of parallax images.

24. The display controller as claimed in claim 19, wherein:
- the judging unit includes a function which judges whether the device is in a first positioning state where a horizontal direction that is a direction in parallel to a straight line connecting between the left eye and the right eye of the observer is substantially in parallel to the first direction or in a second positioning state where the horizontal direction is substantially in parallel to the second direction;
- in the first and the second positioning states,
- the image generating unit takes a quotient acquired by dividing a square of a value of N by a value of M as a total number of viewpoints (J) of the pixel, generates images having M number of viewpoints in either the first or the second direction, and generates images having viewpoints corresponding to a quotient acquired by dividing the total number of viewpoints (J) by the value of M for the other direction; and
- the display panel driving unit outputs the images generated by the image generating unit for each of the first direction and the second direction instead of the same number of parallax images.

\* \* \* \* \*